(12) United States Patent
Schmauder et al.

(10) Patent No.: US 8,680,436 B2
(45) Date of Patent: Mar. 25, 2014

(54) HAND GRIP

(75) Inventors: Werner Schmauder, Huelben (DE);
Richard Penazzi, Bad Urach (DE);
Frank Cherubin, Bad Urach (DE)

(73) Assignee: Gustav Magenwirth GmbH & Co. KG, Bad Urach (DE)

( * ) Notice: Subject to any disclaimer, the term of this patent is extended or adjusted under 35 U.S.C. 154(b) by 953 days.

(21) Appl. No.: 12/012,800

(22) Filed: Feb. 4, 2008

(65) Prior Publication Data

US 2008/0185369 A1 Aug. 7, 2008

(30) Foreign Application Priority Data

Aug. 5, 2005 (DE) .................. 10 2005 039 077

(51) Int. Cl.
*B62D 1/04* (2006.01)
(52) U.S. Cl.
USPC .................................................. 219/204
(58) Field of Classification Search
USPC ......... 219/204, 201, 202, 481, 494, 533, 535;
16/421
See application file for complete search history.

(56) References Cited

U.S. PATENT DOCUMENTS

| | | | | |
|---|---|---|---|---|
| 744,739 A * | 11/1903 | Fliess | .............. | 219/201 |
| 4,471,209 A * | 9/1984 | Hollander | ............... | 219/204 |
| 4,937,429 A * | 6/1990 | Hollander | ............... | 219/204 |
| 4,990,753 A * | 2/1991 | Hollander | ............... | 219/505 |
| 5,613,407 A | 3/1997 | Ogata | | |
| 5,626,780 A | 5/1997 | Ogata | | |
| 6,114,668 A * | 9/2000 | Ogata et al. | ............... | 219/494 |
| 6,686,572 B1 | 2/2004 | Wu | | |
| 2003/0056618 A1* | 3/2003 | Dzurnak | ............... | 74/551.9 |
| 2004/0011777 A1* | 1/2004 | Richlen | ............... | 219/204 |
| 2004/0068844 A1 | 4/2004 | Lumpkin | | |
| 2004/0129107 A1 | 7/2004 | Wu | | |
| 2005/0103769 A1* | 5/2005 | Marquis | ............... | 219/204 |
| 2006/0163232 A1* | 7/2006 | Hollander | ............... | 219/202 |

FOREIGN PATENT DOCUMENTS

| | | |
|---|---|---|
| DE | 830 746 | 2/1952 |
| DE | 847 864 | 8/1952 |
| DE | 195 25 748 | 1/1996 |
| DE | 195 26 029 | 1/1996 |
| EP | 0 857 643 | 8/1998 |

* cited by examiner

*Primary Examiner* — Henry Yuen
*Assistant Examiner* — John Wasaff
(74) *Attorney, Agent, or Firm* — Lipsitz & McAllister, LLC

(57) ABSTRACT

In order to improve a hand grip for handlebar-steered vehicles, comprising a grip covering, made of a grip-covering material, and an accommodating space which extends, by way of its longitudinal extent, from a plug-in opening in a plug-in direction for a grip component of the handlebar, such that it is seated optimally on the grip component of the handlebar, it is proposed that the accommodating space has at least one wall segment which has at least one abutment surface and at least one recess, the abutment surface having surface sub-regions adapted to an outer surface of the grip component, and the at least one recess being disposed between the surface sub-regions and extending approximately parallel to the plug-in direction, as an adhesive reservoir.

17 Claims, 20 Drawing Sheets

HAND GRIP

This application is a continuation of International application No. PCT/EP2006/007728 filed on Aug. 4, 2006.

This patent application claims the benefit of International application No. PCT/EP2006/007728 of Aug. 4, 2006 and German application No. 10 2005 039 077.3 of Aug. 5, 2005, the teachings and disclosure of which are hereby incorporated in their entirety by reference thereto.

BACKGROUND OF THE INVENTION

The invention relates to a hand grip for handlebar-steered vehicles, comprising a grip covering, made of a grip-covering material, and an accommodating space which extends, by way of its longitudinal extent, from at least one plug-in opening in a plug-in direction for a grip component of a handlebar.

Such hand grips are known from the prior art. In the case of these hand grips, the grip covering is usually fitted over a grip base, the grip base being produced from a dimensionally rigid material.

The production of the grip base and also the production of the grip component of the handlebar here give rise to tolerance problems which often result in the grip base being seated with play on the grip component of the handlebar.

It is thus an object of the invention to improve a hand grip of the generic type such that it is seated optimally on the grip component of the handlebar.

SUMMARY OF THE INVENTION

This object is achieved according to the invention, in the case of a hand grip of the type described in the introduction, in that the accommodating space has at least one wall segment which has at least one abutment surface and at least one recess, the abutment surface having surface sub-regions adapted to an outer surface of the grip component, and the at least one recess being disposed between the surface sub-regions and extending approximately parallel to the plug-in direction, as an adhesive reservoir.

The advantage of this solution can be seen in the fact that using the recess as an adhesive reservoir makes it possible to distribute the adhesive as the hand grip is pushed onto the grip component, in particular by rotation of the hand grip, and to deliver it to the surface sub-regions such that, between the latter and the outer surface of the grip component, it is possible to realize a durable and play-free adhesive connection between the hand grip and the handlebar, in particular also the adhesive layer between the surface sub-regions and the outer surface of the grip component aiding tolerance compensation.

Particularly advantageous distribution of the adhesive over the surface sub-regions can be realized by the recess having a width, as seen in the circumferential direction of the grip component, which decreases as the recess extends further in the plug-in direction.

It is further provided, preferably for the purpose of improving distribution of the adhesive, that the recess has a depth, as seen radially in relation to the grip component, which decreases as the recess extends further in the plug-in direction.

Distribution of the adhesive can be improved still further by the recess having a cross-section which decreases as the recess extends further in the plug-in direction.

In principle, the recess could be a recess which is approximately rectangular or semi-circular in cross-section.

A stepwise transition between the recess and the surface sub-regions, however, would adversely affect the best possible distribution of the adhesive, available via the recess, for the purpose of forming as uniform an adhesive layer as possible.

For this reason, it is preferably provided that the recess merges in a step-free manner into the surface sub-region adjoining it, in particular it is provided with a side wall which runs at an acute angle in relation to the adjoining surface sub-region.

Such a substantially step-free transition between the recess and the surface sub-region allows the adhesive to move particularly uniformly out of the recess, over the surface sub-region, and into the gap, in particular when the hand grip, as it is pushed onto the grip component, is rotated in one direction or back and forth in opposite directions.

For this reason, it is particularly advantageous if the recess is provided on both sides with a side wall which runs in this way.

In order to achieve uniform adhesive distribution in particular also over the entire longitudinal extent of the accommodating space, it is preferably provided that the recess extends substantially over the entire longitudinal extent of the accommodating space.

An advantageous solution according to the invention here, which results in very uniform distribution of the adhesive, provides a plurality of recesses which are spaced apart from one another in the circumferential direction of the grip component.

As an alternative, or in addition, to the solutions which have been described thus far, an advantageous exemplary embodiment is formed such that at least one wall segment of the accommodating space is provided with a bearing surface, the bearing surface having surface sub-regions adapted to an outer surface of the grip component, and with a spacer element, which rises up above the bearing surface and creates a gap for accommodating an adhesive layer between the surface sub-regions and an outer surface of the grip component.

The advantage of this solution can be seen in the fact that the spacer element makes it possible to predetermine limits for the height of the gap and, at the same time, to compensate for tolerances.

For example, it is possible here to provide, in the circumferential direction of the grip component, a plurality of spaced-apart spacer elements which thus provide, in the circumferential direction, a more or less uniform gap for the formation of the adhesive layer.

The spacer element could be formed, in principle, as a protuberance or block.

A solution which is advantageous for the production of the spacer element provides that the spacer element is in the form of a bead extending in the plug-in direction.

The spacer element can be produced particularly advantageously when it extends continuously from the plug-in opening to one end of the accommodating space.

It is particularly advantageous if the spacer element extends substantially over the entire longitudinal extent of the accommodating space.

In order for the adhesive to be distributed as uniformly as possible, it has proven to be particularly advantageous if a surface sub-region of the bearing surface is located between the spacer element and the recess, this making it possible to define, in respect of its height, the height of the gap which forms over the surface sub-region and into which the adhesive layer is to penetrate as a result of adhesive being fed from the recess.

It is particularly advantageous if a spacer element is provided on both sides of the respective recess.

A particularly suitable solution provides that the surface sub-regions of the bearing surface are provided between the recess and the spacer elements located on both sides of the recess.

It is particularly advantageous to provide such spacer elements in a grip base which has a grip tube and is made from a non-soft/resilient material, but from a plastics material from which the spacer elements are then also produced, so that, as the hand grip is pushed onto such a grip tube, deformation of the spacer elements is likewise possible, albeit to a small extent.

As an alternative, or in addition, the object mentioned in the introduction is achieved according to the invention, in the case of a hand grip of the type described in the introduction, in that the hand grip has a grip base and the grip covering, which covers over the grip base, and in that a supporting structure made of deformable material is integrally formed on the grip base in the region of the accommodating space and allows the grip base to be supported on the grip component of the handlebar.

The advantage of this solution can be seen in the fact that using the supporting structure made of deformable material makes it possible to compensate for production tolerances between the grip base and the grip component of the handlebar, and thus always to ensure an optimum fit of the hand grip on the grip component, the supporting structure here being subjected to more or less pronounced deformation.

In respect of the method of integrally forming the supporting structure on the grip base, various possibilities are conceivable. For example, it would be conceivable for the supporting structure to be inserted, as an independent part, into the accommodating space of the grip base.

It is particularly advantageous, however, if the supporting structure is integrally formed on the grip base by injection molding, since this allows straightforward production of the supporting structure along with optimum fixing on the grip base.

It would be possible, in principle, for the supporting structure to be made of a deformable material which is suitable for the respective function. In order, however, for the hand grip to be produced in as straightforward and cost-effective a manner as possible, it is preferably provided that the deformable material corresponds to a grip-covering material, so that the same material can be used both for the grip covering and for the supporting structure.

If use is made of the same materials for the grip covering and the supporting structure, an exemplary embodiment which is particularly advantageous for reasons of simplicity of production provides that the grip covering is integrally formed on the grip base by virtue of the grip base being encapsulated by the grip-covering material using injection molding, and that the supporting structure is integrally formed on the grip base in an injection-molding operation together with the grip covering.

This solution has the great advantage that it is thus possible for both the grip covering and the supporting structure to be integrally formed on the grip base in a single injection-molding operation.

In order to ensure that both the supporting structure and the grip covering are retained to good effect on the grip base, a particularly advantageous solution provides that the supporting structure is connected directly to the grip covering by way of through-passages passing through the grip base.

Such a direct connection between the grip covering and the supporting structure makes it possible for the latter to be connected in a stable manner to the grip base, so that, in particular when the grip base is pushed onto the grip component of the handlebar, it is not possible for the supporting structure to become detached and, in the same way, it is not possible either for the grip covering to become detached from the grip base even if it is subjected to pronounced loading.

Such a solution can be realized particularly advantageously when the supporting structure is formed by grip-covering material passing through the through-passages in the grip base during injection molding of the grip covering, so that the supporting structure connected to the grip covering can be produced in one operation.

The formation of the supporting structure has not been described any more specifically thus far. The supporting structure here could be formed merely from ribs.

An advantageous solution, however, provides that the supporting structure has an abutment surface which can be positioned on a surface of the grip component on account of elastic deformation, so that surface-area support of the grip base on the grip component takes place.

It would be possible, in principle, for the supporting structure to be supported over its entire surface area on the surface of the grip component.

In order, however, for it to be possible to optimize the deformation behavior of the supporting structure, it is preferably provided that the supporting structure is formed from sub-regions which are separated from one another, at least in part, by recesses. This makes it possible for sub-regions of the supporting structure to be able to deform optimally and, in particular, independently of one another.

It is particularly advantageous if the bearing surface of the supporting structure is divided up into surface sub-regions by the recesses in the supporting structure, it then being possible for these surface sub-regions to be positioned on the surface of the grip component.

The recesses have not been described any more specifically thus far. A particularly advantageous solution provides that the recesses pass through the supporting structure from the bearing surface to the grip base.

The recesses here may run in any shape, for example helically or in a crosswise manner, within the supporting structure.

A particularly advantageous solution provides that the recesses are elongate and run approximately parallel to a longitudinal center axis of the grip base.

It is thus also expediently provided that the bearing surface of the supporting structure rests only on sub-regions of the surface of the grip component.

In order to achieve optimally reliable support of the hand grip on the grip component, it is preferably provided that the supporting structure, overall, forms a holder for the grip component.

The connection between the hand grip and the grip component of the handlebar has not been described any more specifically thus far. An advantageous solution therefore provides that the grip base can be connected in a positive manner to the grip component via a retaining element.

Such a retaining element may be, for example, a retaining pin or a screw, which engages through both the grip base and the grip component.

In the simplest case here, the screw is screwed through the grip base into a holder of the grip component.

As an alternative to this, an advantageous solution provides that the grip base can be connected to the grip component via the supporting structure.

In this case, the entire handle grip is secured via the supporting structure and not via an additional retaining element acting between the grip base and the grip component.

In the simplest case here, the supporting structure can be connected integrally to the grip component.

Such an integral connection involves, for example, the use of an adhesive.

In particular the case where recesses are provided in the supporting structure thus allows optimum application of the adhesive to the supporting structure, and in particular the bearing surface of the supporting structure, and a distribution of the adhesive thereon since, as the hand grip is pushed on, an adhesive which has been applied to the grip component or the supporting structure enters into the recesses and can be distributed more uniformly on the bearing surface of the supporting structure by way of the recesses, in particular as a result of a relative movement between the grip component and the supporting structure, for example by virtue of the supporting structure being pushed on and rotated at the same time.

It is particularly advantageous for production reasons if the hand grip is constructed from parts which encompass the grip component in a state in which they are closed in the circumferential direction.

As an alternative, or in addition, to the solutions which have been described thus far, a particularly advantageous exemplary embodiment provides that the hand grip can be heated electrically.

It is thus easily possible, in particular in the case of handlebar-steered vehicles for use in low outdoor temperatures, to provide the hand grip with the necessary level of comfort.

It is particularly advantageous here if the grip base is provided with heating wires which form at least one heating loop, can easily be disposed on the grip base and can then be fixed in the hand grip according to the invention by virtue of the grip base being encapsulated by the grip covering using injection molding.

One exemplary embodiment provides that the heating wires form at least one heating coil, since this can easily be disposed on the grip base.

An advantageous solution provides that the heating wires forming the heating loop are connected at the ends by a turn-back component.

The turn-back component here may preferably be a separate part which is connected to the heating wires.

An easy-to-produce solution, however, provides that the heating wires and the turn-back component are formed by a single-piece continuous wire.

The operation of fixing the heating coil has not been described any more specifically thus far. For example, it would be conceivable to fix the heating coil on the grip base over its entire length.

An advantageous solution, however, provides that the heating coil can be fixed at the ends on the grip base.

All methods of fixing the heating coil at the ends are conceivable here.

For example, it is conceivable for the heating coil to be adhesively bonded at the ends to the grip base.

A solution which is advantageous in production terms provides that the heating coil can be fixed at the ends in a holder on the grip base.

Such a holder is formed, for example, as a protrusion or depression or as a hook or the like.

It is particularly advantageous if the heating coil can be fixed at the ends on the grip base by way of the turn-back component.

Such fixing of the turn-back component of the heating coil has the advantage that the turn-back component can easily be secured on the heating coil, for example in the holder.

It is possible here for the holder to be disposed directly on the grip base, for example by the holder being injection molded, or even adhesively bonded, directly on the grip base or being created by a forming process during the production of the grip base.

Another, expedient solution, however, provides that the heating coil can be fixed at the ends on the grip base via an insert part which can be fixed on the grip base.

In particular, it is advantageous here if the insert part has the holder for the turn-back component of the heating coil.

It is even more advantageous, however, if a turn-back component provided at the ends of the heating coil can be fixed on the grip base via an insert part.

Such an insert part makes it possible to fix the turn-back component straightforwardly on the grip base.

For example, such an insert part could be used to secure the turn-back component on the grip base by clamping.

A particularly advantageous solution, however, provides that the insert part has a holder which is intended for accommodating the turn-back component of the heating coil and in which the turn-back component can be fitted.

The insert part could be fixed on the grip component, in principle, by adhesive bonding or a screw connection.

A particularly advantageous solution provides that the insert part can be fixed on the grip base by form-fitting elements which are integrally formed on both, so that it is thus easily possible for the insert part to be fixed.

In order for it also to be possible for the heating wires to be fixed on the grip base in the region of the supply line, it is preferably provided that the supply line can be fixed in a fixing element on the grip base.

It is thus possible to fix the heating wires on the grip base, in particular in conjunction with the turn-back component, so that the heating wires are definitely secured for the subsequent encapsulation of the grip base using injection molding in order for the grip covering to be integrally formed on.

Furthermore, such a fixing element also allows the supply line to be secured relative to the grip base, so that, even in the region where the heating wires are connected to the supply line, tensile loading does not occur.

The supply line can be retained on the fixing element in a wide variety of different ways. An advantageous solution provides that the supply line is retained in a force-fitting manner on the fixing element.

In particular, the supply line is clamped by the fixing element.

In order also for the supply line to be permanently secured in the region of the fixing element when the grip base is encapsulated using injection molding, in order for the grip covering to be integrally formed on, it is preferably provided that the fixing element is embedded in the grip covering.

Furthermore, it is expediently provided that a kink guard for the supply line is integrally formed on the grip covering.

Optimum heating of the hand grip has not been described any more specifically thus far. A particularly advantageous embodiment therefore provides that a plurality of heating loops are provided in the hand grip.

Providing a plurality of heating loops makes it possible to optimize the heating capacity in the hand grip.

In particular, it is advantageous here if the plurality of heating loops can be energized in parallel, so that different heating capacities are thus available in the hand grip as a result of the heating loops being energized jointly or alternately.

A particularly advantageous solution here provides that the heating loops have different heating capacities, so that optional activation of the respective heating loops means that the heating capacities of the latter are available individually or in combination.

In particular, the provision of a plurality of heating loops which can be energized in parallel makes very straightforward control of the heating capacity possible to the effect that just straightforward electrical switching elements are required in order to activate or deactivate the respective heating loops, and there is therefore no need for any high-outlay electronic regulation of the heating capacity.

Particularly straightforward control of the heating capacity can be achieved when the plurality of heating loops are assigned a switching device which can activate one or more heating loops.

Furthermore, an advantageous solution provides that the plurality of heating loops are formed from electrically insulated electric lines. This makes it possible for the plurality of heating loops to be laid such that there is no need to ensure that they are electrically insulated.

A particularly straightforward and advantageous method of insulation provides that the electric lines are enamel-insulated.

In order to allow the plurality of heating loops to be easily disposed on the grip base, it is provided that the plurality of heating loops can be fixed at the ends in the same holder provided on the grip base.

It is possible for this holder, as has already been described, either to be disposed directly on the grip base, for example to be formed therein, or to be provided on the insert part.

Furthermore, an advantageous solution provides that the plurality of heating loops are disposed on the grip base with heating wires running one beside the other.

Such an arrangement of a plurality of heating wires located one beside the other makes it possible, for example, to dispose the heating loops on the grip base such that the respective first and second heating wires of the plurality of heating loops run in the same grooves.

As an alternative to this, an advantageous solution provides that the respective first and second heating wires of the plurality of heating loops run between the same protrusions.

Further features and advantages of the invention form the subject matter of the following description and of the illustration of a number of exemplary embodiments.

DETAILED DESCRIPTION OF THE INVENTION

Figure 1:
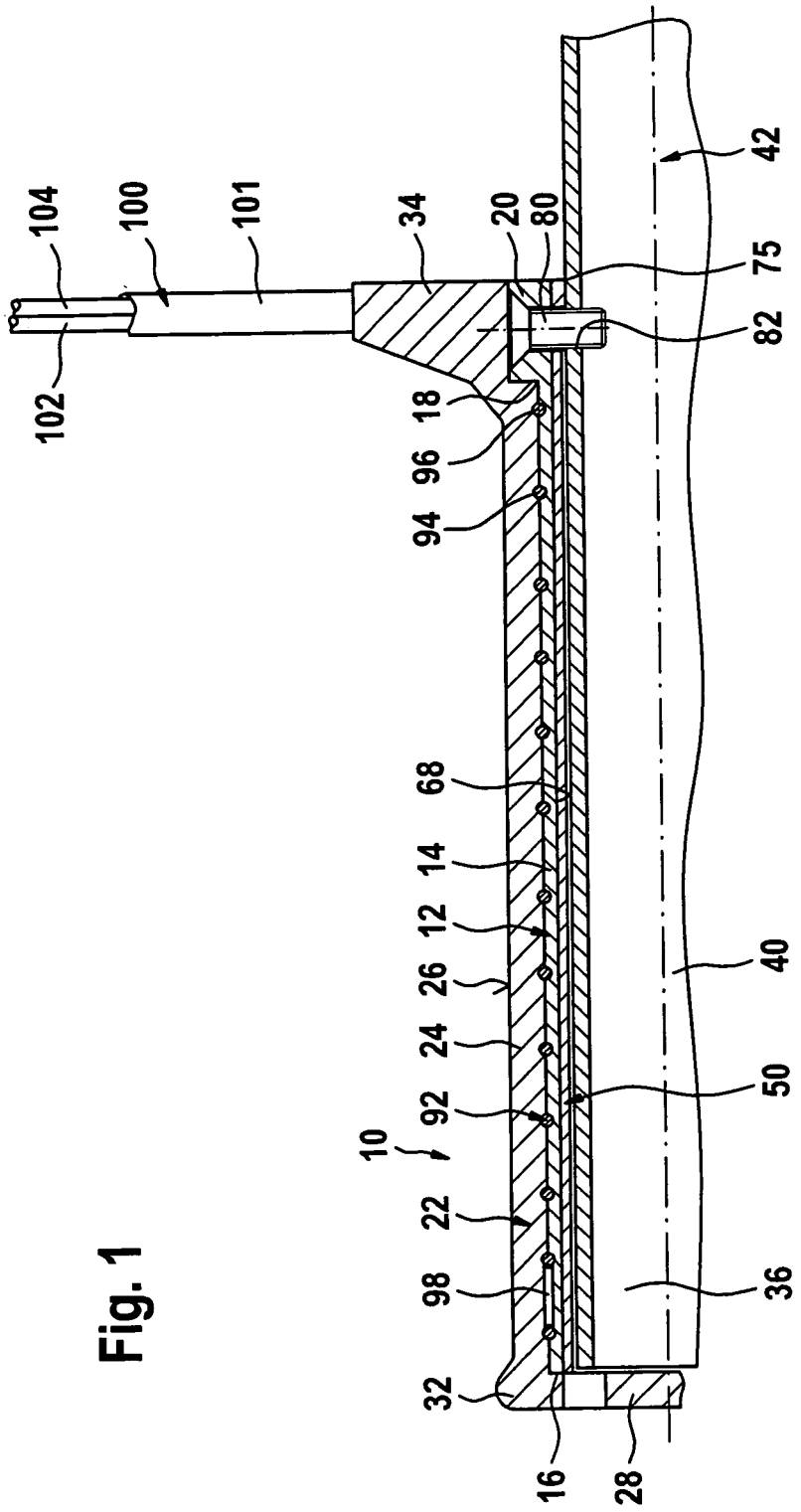
FIG. 1 shows one side of a longitudinal section through a first exemplary embodiment of a hand grip according to the invention positioned on a grip component of a handlebar of a handle bar-steered vehicle.

A first exemplary embodiment, illustrated in FIG. 1, of a hand grip according to the invention, which is designated as a whole by 10, comprises a grip base 12 which has a grip tube 14 which is closed, in particular in the azimuthal direction, extends from an outer end 16 to an inner end 18 and merges into a grip-tube collar 20 in the region of the inner end 18.

The grip base 12 here is preferably formed from a substantially stiff and dimensionally stable plastics material and constitutes a dimensionally stable base for the hand grip 10.

The grip base 12, furthermore, is enclosed by a grip covering 22 which is likewise closed in the azimuthal direction, likewise extends, over the entire grip tube 14, from the outer end 16 to the inner end 18, and also across the grip-tube collar 20, and completely covers over these components. The grip covering 22 here is formed from a soft/resilient, and thus deformable, material which, with a covering tube 24 which engages over the grip tube 14, forms a grip surface 26 which, on account of the covering tube 24 formed from the soft/resilient material, can deform at least slightly as it is gripped by a human hand, and thus feels pleasant to grip.

The grip covering 22 here also comprises an outer end portion 28, which engages over the outer end 16 of the grip tube 14, and a guide bead 32, which is disposed in the region of the outer end portion 28, projects radially outward beyond the grip surface 26 and is intended for a hand which is resting on the grip surface 26.

The grip covering 22 further comprises an inner guide ring 34 which is disposed in the region of the inner end 18 of the grip tube 14, and for example also in the region of the grip-tube collar 20, and engages over the collar.

Figure 2:
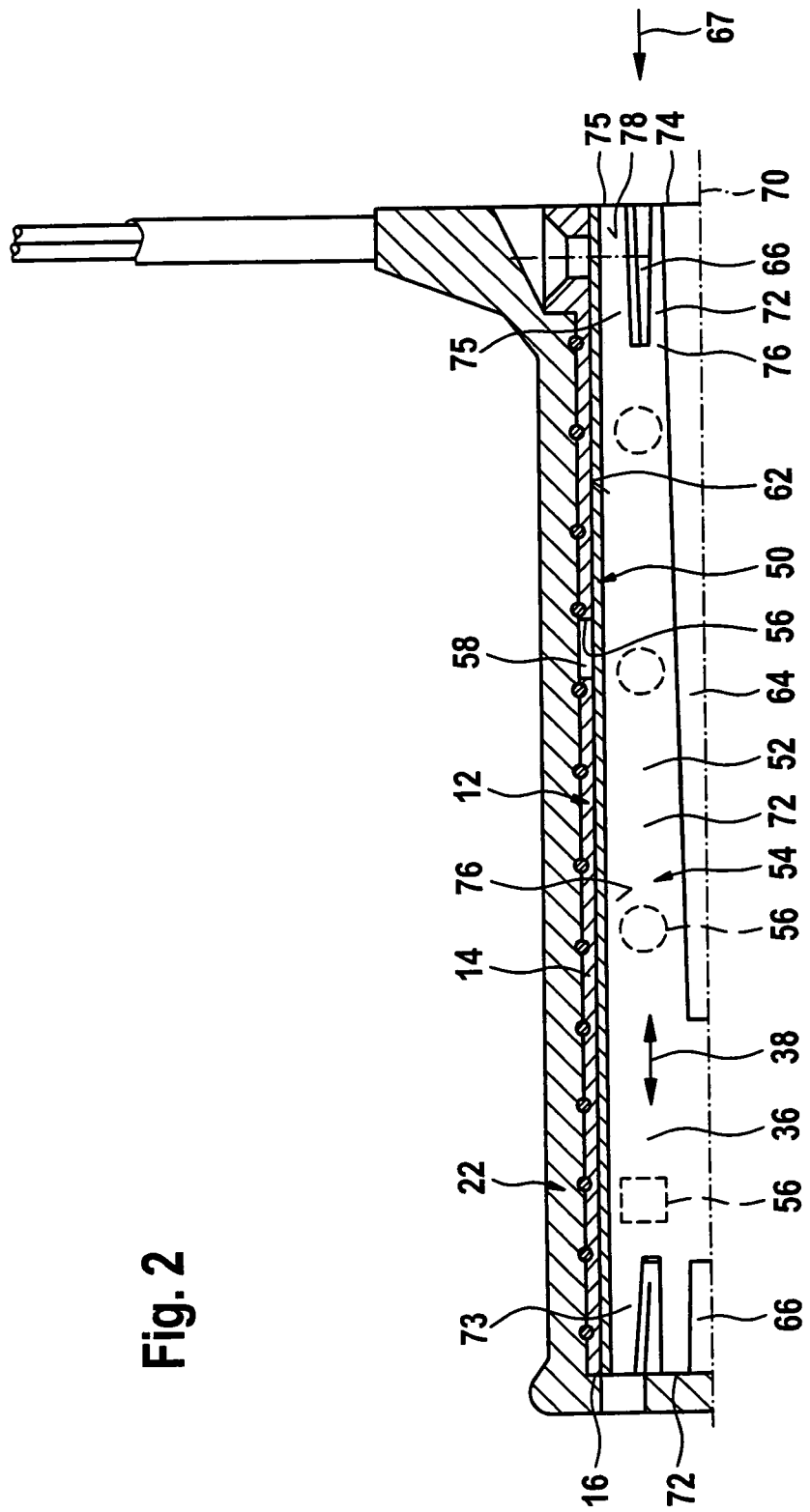
FIG. 2 shows an illustration of the first exemplary embodiment without the grip component of the handlebar.

As is illustrated in FIG. 2, the grip base 12 encloses an accommodating space 36 which extends, by way of a longitudinal extent 38, within the grip base 12 and is intended for receiving a grip component 40, illustrated in FIG. 1, of a handlebar 42 of a handlebar-steered vehicle, the grip component 40 engaging fully in the accommodating space 36 and being enclosed all the way round by the hand grip 10 according to the invention.

In order for it to be possible then to position the dimensionally rigid grip base 12 on the grip component 40 of the handlebar 42, all tolerances being compensated for in the process, a side of the grip base 12 which is directed away from the grip covering 22 has applied to it a supporting structure which is designated as a whole by 50, is produced from a soft/resilient material and comprises a bearing surface 52 which can be positioned on a surface of the grip component 40 and, for its part, forms a holder 54 for the grip component of the handlebar.

In the case of the first exemplary embodiment, which is described with reference to FIGS. 1 and 2, the supporting structure 50 is produced from the same soft/resilient material as the grip covering 22 and is connected to the grip covering 22 via connecting stubs 58 which pass through through-passages 56 in the grip base 12, the connecting stubs being formed integrally both on the grip covering 22 and on the supporting structure 50. The grip base 12 is preferably provided with a multiplicity of such through-passages 56, which have a corresponding number of connecting stubs 58 passing through them, so that the grip covering 22 and the supporting structure 50 are fixed in an ultimately positive manner relative to the grip base 12 solely by the fact that the surface of the supporting structure 50 extends over an inner surface 62 of the grip tube 14 of the grip base 12, this inner surface being directed toward the grip component 40, while the covering tube 24 of the grip covering 22 extends on the opposite side.

The supporting structure 50 can preferably be produced in that, as the covering tube 24 is injection molded onto the grip base 12, material which forms the grip covering 22 passes through the through-passages 56 of the grip base 12 and makes its way over the inner surface 62 of the grip tube 14, so that both the grip covering 22 and the supporting structure 50 can be injection molded on the grip base 12 in one production step, and consequently just a single production step is required in order for the grip covering 22 and the supporting structure 50, and the connecting stubs 58 which connect the same, to be integrally formed on the grip base 12 and connected in a positive manner thereto.

The supporting structure 50 here covers over the inner surface 62 of the grip tube 14 over largely its entire surface area to form the bearing surface 52, which has a surface-area extent equal to at least two thirds of the surface-area extent of the inner surface 62 of the grip tube 14.

The extent of the surface area of the supporting structure 50 is interrupted by recesses 64, 66, it being the case that these recesses 64, 66 extend in the direction parallel to a plug-in direction 67, or in the direction opposite to said plug-in direction, and approximately parallel to a longitudinal center axis 70 of the grip base 12 and of the hand grip 10, in particular parallel thereto, and, starting from the bearing surface 52 of the supporting structure, reach into the supporting structure, preferably as far as the inner surface 62 thereof, in the radial direction in relation to the grip component 40, and thus in relation to a direction of the grip base 12.

Furthermore, preferably starting from a respective end face 72 of the supporting structure 50, this end face being located in the region of the outer end 16 of the grip base 12, the recesses 64, 66 extend in the direction of an opposite end face 74 containing the plug-in opening 75 of the supporting structure 50, the end face 74 being located in the region of the grip-tube collar 20 of the grip base 12, or vice versa. In this case, for example short recesses 66 of this type extend from the respective end face 72 or 74, in the direction of the respectively other end face 74 or 72, over a distance corresponding to less than half the extent of the grip base 12 in the direction of the longitudinal center axis 70, or in the form of the elongate recesses 64 extend over more or less half, or more than half, the extent of the grip base 12 in the direction of the longitudinal center axis 70.

The recesses 64, 66, which extend into the supporting structure 50 in the direction of the grip base 12, subdivide the supporting structure 50 as a whole into strip-like sub-regions 72 and/or 74, which then, for their part, form surface sub-regions 76, 78 of the bearing surface 52, the sum of all the surface sub-regions 76, 78 as a whole likewise giving a surface-area extent equal to at least half the surface-area extent of the inner surface 62 of the grip base 12, or even better at least two thirds of this surface-area extent, so that, overall, the hand grip 10 is supported over a large surface area on the grip component 40 of the handlebar 42.

Moreover, the surface-area extent of the surface sub-regions 76, 78 is equal to more than two thirds of the surface-area extent of an outer surface 68 of the grip component 40 on which the surface sub-regions 76, 78 rest.

The fact that the supporting structure 50 is produced from a soft/resilient material makes it possible for the supporting structure 50 to compensate for production tolerances in the region of the grip component 40 of the handlebar 42, and production tolerances of the grip base 12, by corresponding deformation of the grip-supporting structure, and thus for the grip base 12 always to be supported in a play-free manner on the grip component 40.

It is possible here, as is illustrated in FIG. 1, for the hand grip 10 to be fixed via a screw 80 which passes through, for example, the grip-tube collar 20 of the grip base 12 and the supporting structure 50 and engages in a screw hole 82 in the grip component 40 of the handlebar 42.

Figure 3:
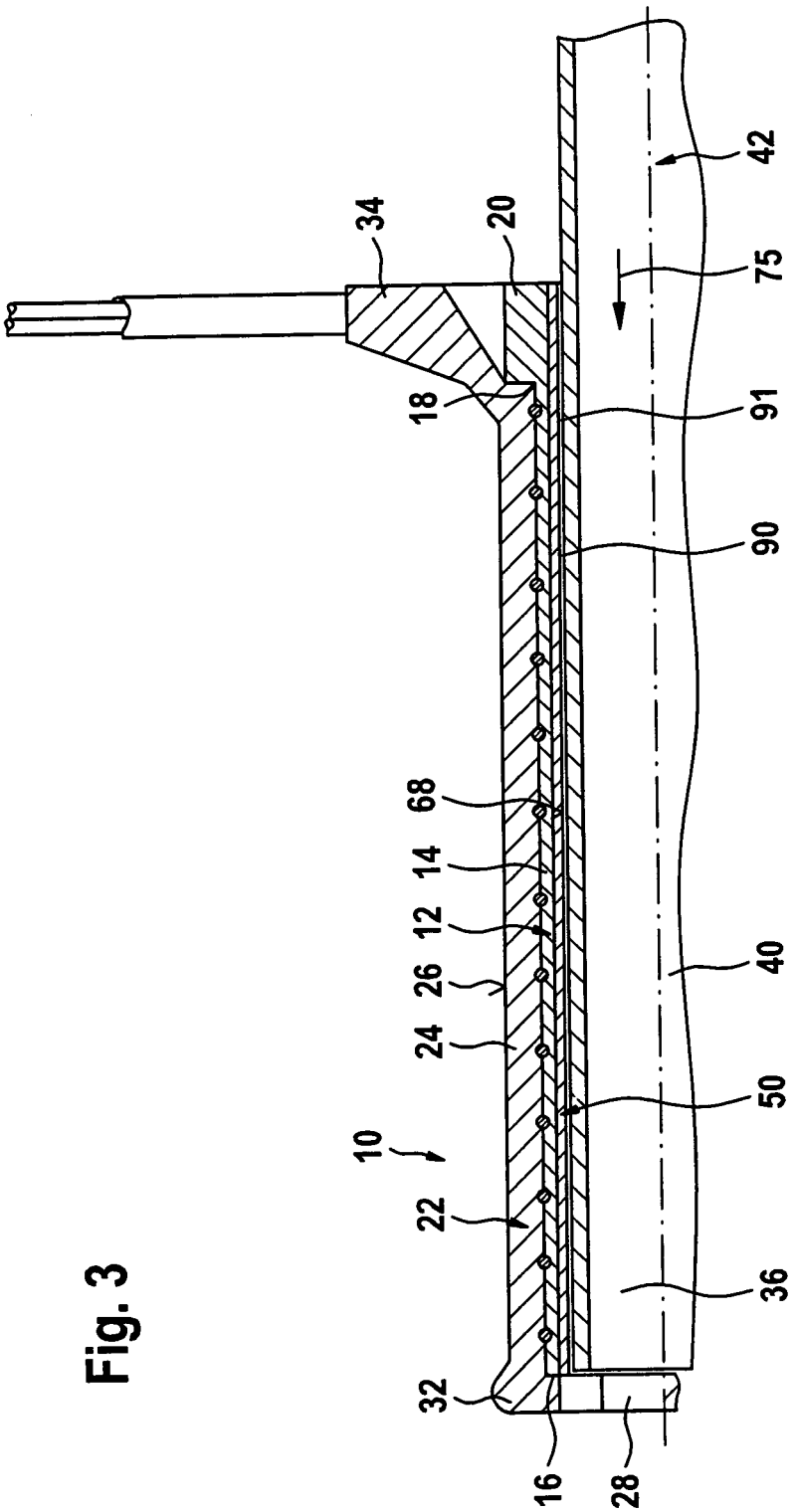
FIG. 3 shows an illustration, similar to FIG. 1, of a second exemplary embodiment of a hand grip according to the invention.

As an alternative to this, as is illustrated in FIG. 3 in conjunction with a second exemplary embodiment, the hand grip 10 is fixed on the grip component 40 via an adhesive layer 90 which acts over the surface area formed by a gap 91 between the abutment surface 52 of the supporting structure and the outer surface 68 of the grip component 40, application of the adhesive layer 90 being facilitated by way of the recesses 64, 66, which serve as an adhesive reservoir, into which adhesive penetrates as the hand grip 10 with the supporting structure 50 is pushed on, and through which the adhesive can be distributed into the gap 91 between the bearing surface 52 and the surface 68 of the grip component 40 as the supporting structure 50 is pushed on to the grip component 40.

Figure 4:
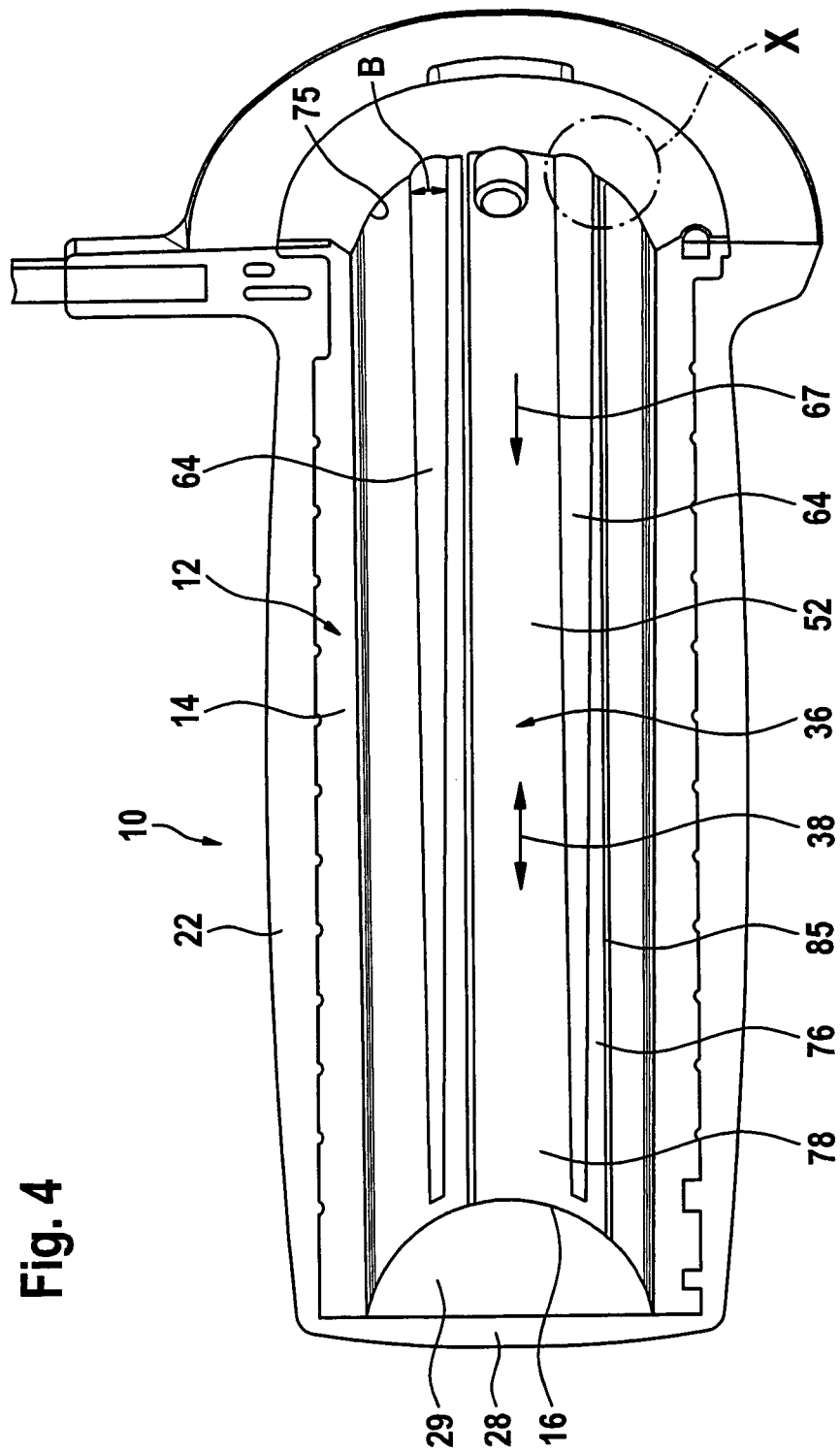
FIG. 4 shows an illustration, similar to FIG. 1, of a third exemplary embodiment of a hand grip according to the invention.

In the case of a third exemplary embodiment, which is illustrated in FIG. 4, the hand grip according to the invention, which is designated as a whole by 10, comprises the grip base 12 with the grip tube 14, which is likewise closed in particular in the azimuthal direction and on which is disposed the grip covering 22, which is likewise closed in particular in the azimuthal direction.

In the case of this third exemplary embodiment, the grip base 12 itself forms the recess 36, which extends from the plug-in opening 75 substantially through the entire grip tube 14, which, as a single part, encloses the recess 36.

In the case of this exemplary embodiment, the recesses 64 are formed in the grip tube 14 itself, which is of dimensionally stable plastics material, and the recesses extend from the plug-in opening 75, in the plug-in direction 67, substantially to the outer end of the grip tube, against which the end portion 28 of the grip covering 22 also butts, the grip covering closing off, on its side which is located opposite the plug-in opening 75, the accommodating space 36 by way of an inner wall 29.

As has already been described in conjunction with the exemplary embodiments above, the plurality of recesses 64 distributed circumferentially around the grip component 40 subdivide the bearing surface 52 into surface sub-regions 76 and 78, which are located on both sides of the respective recess 64.

Figure 5:
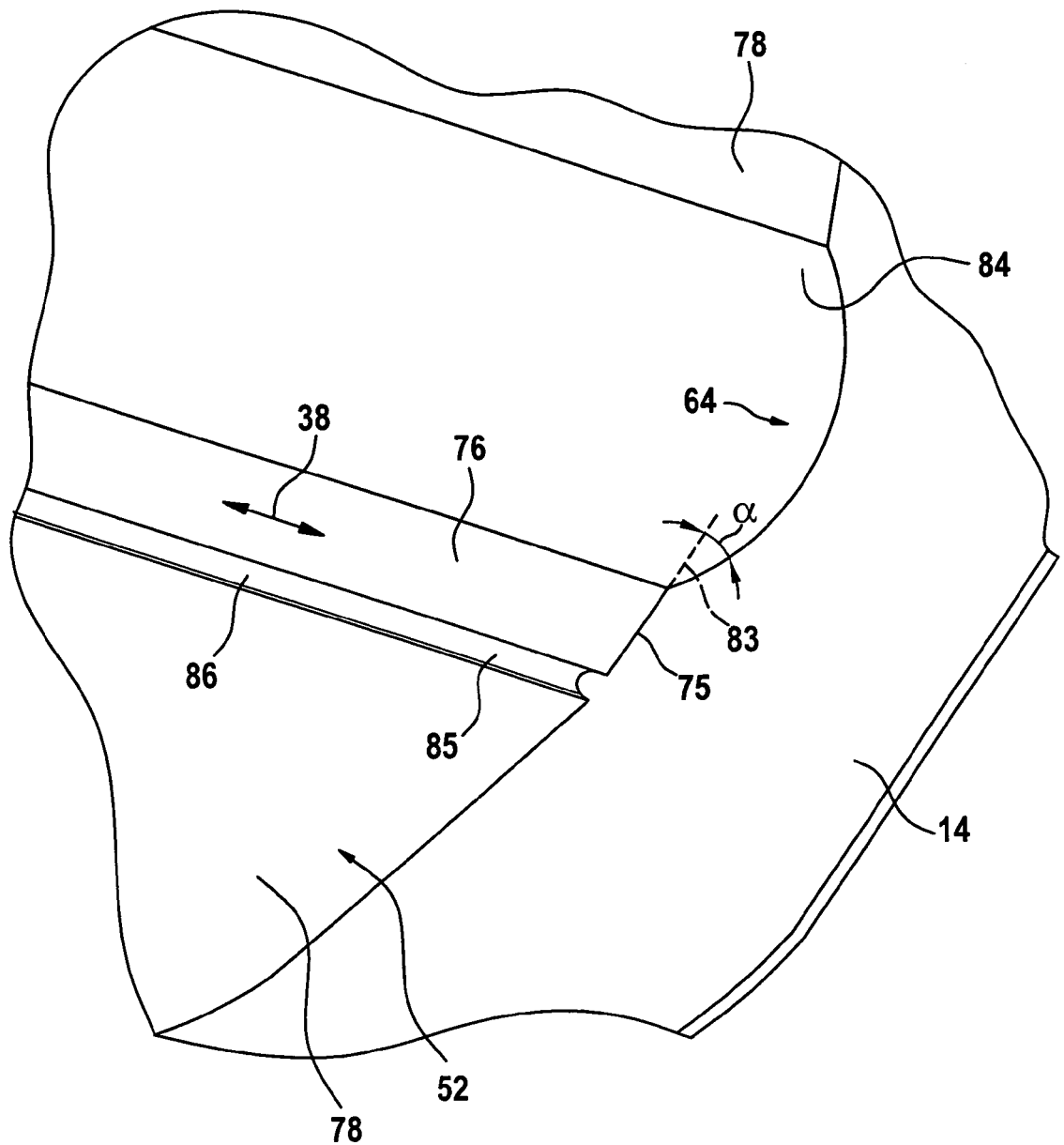
FIG. 5 shows an illustration, in the form of an enlarged detail, of a region X in FIG. 4.

As is illustrated on an enlarged scale in FIG. 5, the recess 64 is preferably formed such that, starting from the surface sub-regions 76 and 78 of the bearing surface 72, it extends as a depression into the grip tube 14 and, in this case, borders on the respective surface sub-regions 76, 78 of the bearing surfaces 52 by way of side walls 83, 84 which run at an acute angle α in relation to the surface sub-regions 76, 78, this resulting in a substantially step-free transition between the recess 64 and the surface sub-regions 76, 78, and this transition making it easier for the adhesive to slide out of the recess 64, via the side surfaces 83, 84, in order for it to be possible for the adhesive to move advantageously out of the recess 64 into the gap 91 between the surface sub-regions 76 and 78 and the outer surface 68 of the grip component 40, in order that the adhesive can solidify in the gap 91 and provide adhesion there between the outer surface 68 of the grip component 40 and the surface sub-regions 76, 78.

In order, in the case of the grip tube 14, which is produced substantially from non-soft/resilient plastics material, for the gap 91 to be formed uniformly around the grip component 40 in the circumferential direction, spacer elements 85 rise up from the bearing surface 52 at defined angular spacings around the grip component 40, and these spacer elements are formed as strips extending in the direction of the longitudinal extent 38, substantially approximately parallel thereto, and are then supported on the outer surface 68 of the grip component by way of crest surfaces 86, so that the surface sub-regions 76, 78 of the bearing surface 52, these surface sub-regions being located on both sides of the spacer elements, can form the gap 91, which is needed for accommodating the adhesive, with the height which is necessary for the respective adhesive.

The spacer elements 85 here are preferably formed as narrow strips arranged at a distance in the circumferential direction of the grip component 40 which, as the grip component 40 is plugged in via the plug-in opening 75, may be subjected to a certain amount of deformation in order to compensate for tolerances, in any case such that all the spacer elements 85 disposed around the grip component 40, for support thereon, are deformed approximately to the same extent, this also resulting in substantially equal heights of the gap 91 in each case alongside the spacer elements 85 in the circumferential direction around the grip component 40.

As is illustrated for the third exemplary embodiment, in particular in FIG. 4, the spacer elements 85 in the circumferential direction around the grip component 40 have the same thickness, and approximately the same cross-sectional surface area, over the entire longitudinal extent 38 of the accommodating space 36.

In contrast, the recesses 64 are formed such that their width B, as seen in the circumferential direction around the grip component 40, decreases as the recesses extend further in the plug-in direction 67.

Moreover, the depth of the recesses 64 is also selected such that, starting from the plug-in opening 75, this decreases as the recesses 64 extend further in the plug-in direction 67, so that it is also the case overall, starting from the plug-in opening 75, that a cross-sectional surface area of the recesses 64 decreases as the recesses 64 extend further in the plug-in direction 67.

Moreover, in the case of the third exemplary embodiment of the hand grip according to the invention, those elements which are identical to those of the exemplary embodiments above have been provided with the same reference numerals, so that, in respect of the description thereof, reference can be made in full to what has been said in relation to the exemplary embodiments above.

Figure 6:
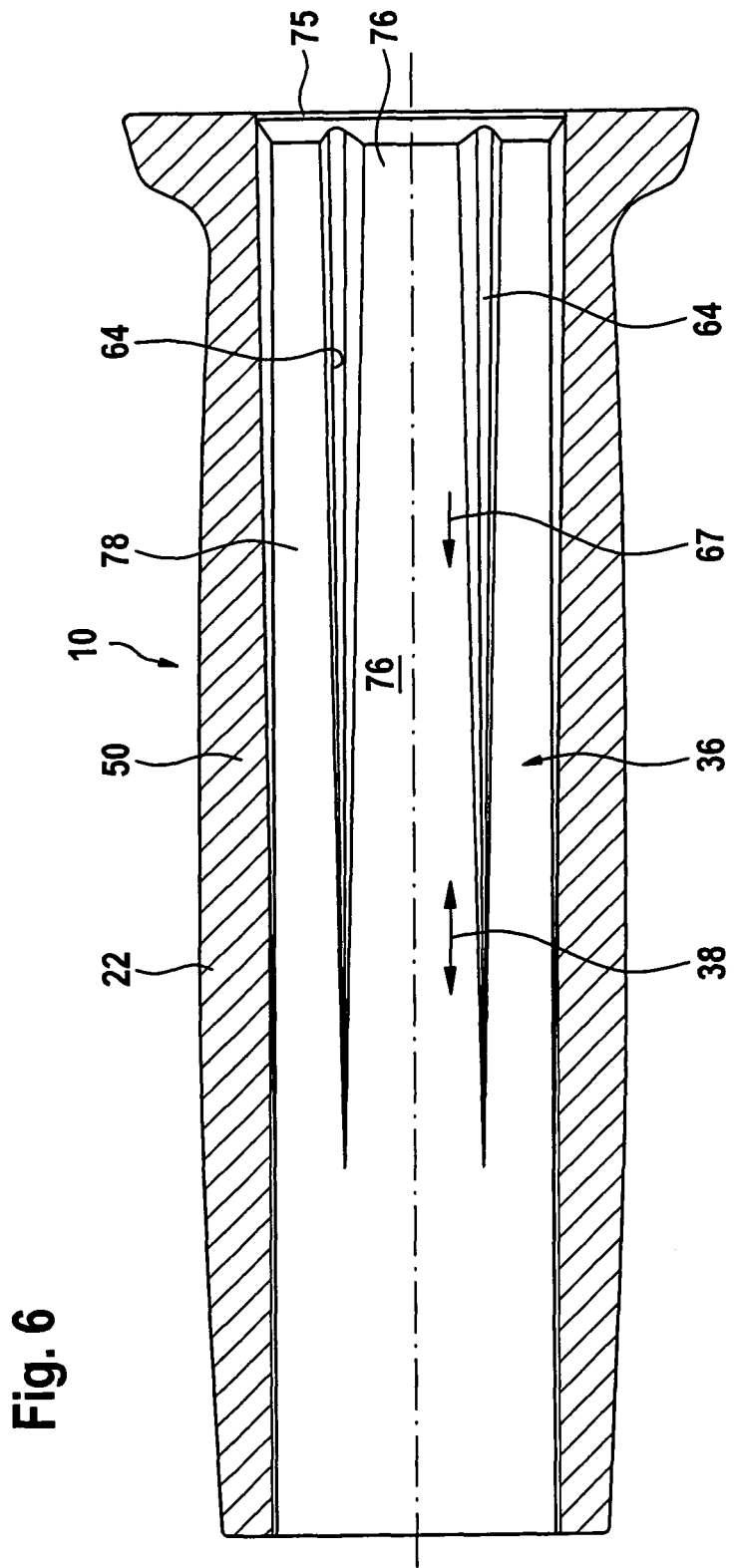
FIG. 6 shows an illustration, similar to FIG. 1, of a fourth exemplary embodiment of a hand grip according to the invention.

In the case of a fourth exemplary embodiment of a hand grip 10 according to the invention, this exemplary embodiment being illustrated in FIG. 6, the grip covering 22 and the supporting structure 50 form a single, integral part made of soft/resilient material, so that the supporting structure 50 contains the accommodating space 36, which, in the same way as has been described for the second exemplary embodiment, has the recesses 64, which, starting from the plug-in opening 75, extend into the accommodating space 36 in the plug-in direction 67 and, as they extend further in the plug-in direction, have a decreasing width B and a decreasing depth and thus, overall, a decreasing cross-section.

Moreover, those elements of the fourth exemplary embodiment which are identical to those of the exemplary embodiment above have been provided with the same reference numerals, so that, in respect of the description of the same, reference can be made in full to what has been said in relation to the exemplary embodiments above.

Moreover, it is also possible for the fourth exemplary embodiment of the hand grip according to the invention to be formed as a heated hand grip, for which purpose for example the fourth exemplary embodiment may be configured in a manner corresponding to the other exemplary embodiments.

As has been illustrated for the first exemplary embodiment according to FIGS. 1 and 2 or for the second exemplary embodiment according to FIG. 3, or as has been indicated for the third exemplary embodiment according to FIG. 4, the hand grip 10 is preferably formed as a heatable hand grip and thus has a heating coil 92 which is wound onto the grip base 12 and preferably comprises two heating wires running parallel to one another, namely a first heating wire 94 and a second heating wire 96, which are wound helically, but at a spacing apart from one another, onto the grip tube 14 and are connected to one another at their individual ends by a U-shaped turn-back component 98 at one end of the heating coil 92 which is located, for example, in the vicinity of the outer end 16 of the grip tube 14.

The heating wires 94, 96 and the turn-back component 98 here may be formed by a continuous wire, but it is also conceivable to provide the turn-back component 98 in the form of a component to which the heating wires 94, 96 are connected.

In the vicinity of another end of the heating coil 92, the heating wires 94, 96 are connected to individual conductors 102, 104 of a supply line, which is designated as a whole by 100 and leads to a power source which allows current to flow from one of the heating wires 94, 96, via the turn-back component 98, into the other heating wire 96, 94, in order thus for heat to be generated in the region of the heating wires 94, 96.

A wide variety of different solutions are conceivable for the purpose of guiding the two heating wires 94, 96 at a spacing apart from one another. Thus, for example in the case of a fifth exemplary embodiment according to FIG. 7, the grip base 12 has provided on it protrusions 106 which project radially outward beyond the grip tube 14 and keep the heating wires 94, 96 spaced apart from one another as they are wound onto the grip base 12 and thereafter. The protrusions 106 are preferably disposed in a plurality of circumferentially spaced-apart rows 112, 114 running approximately parallel to the longitudinal center axis 70, so that the heating wires 94, 96 are fixed securely on the grip tube 14. This makes it possible to use, for example, heating wires 94, 96 which have not been electrically insulated, since the protrusions 106 prevent mutual contact prior to the turn-back component 98 being reached.

Figure 7:
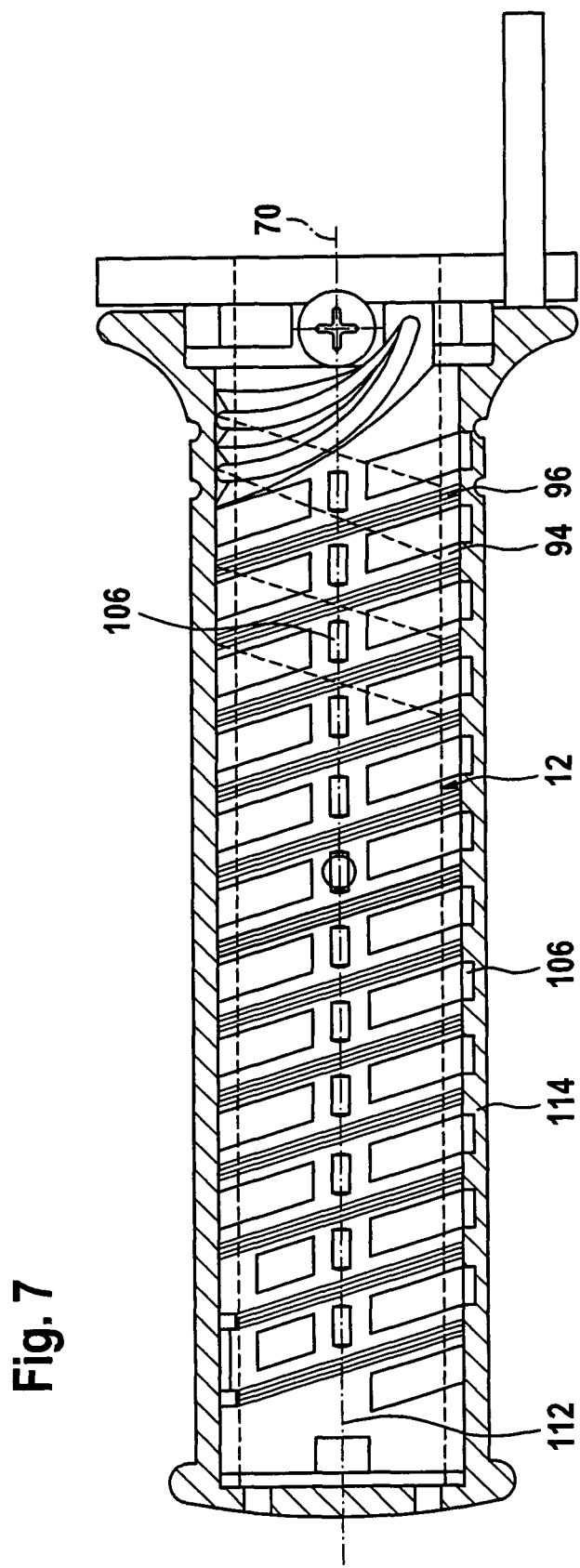
FIG. 7 shows an illustration of a fifth exemplary embodiment of a hand grip according to the invention, with the grip covering illustrated merely in section, but with a plan view of the grip base with heating coil.
Figure 8:
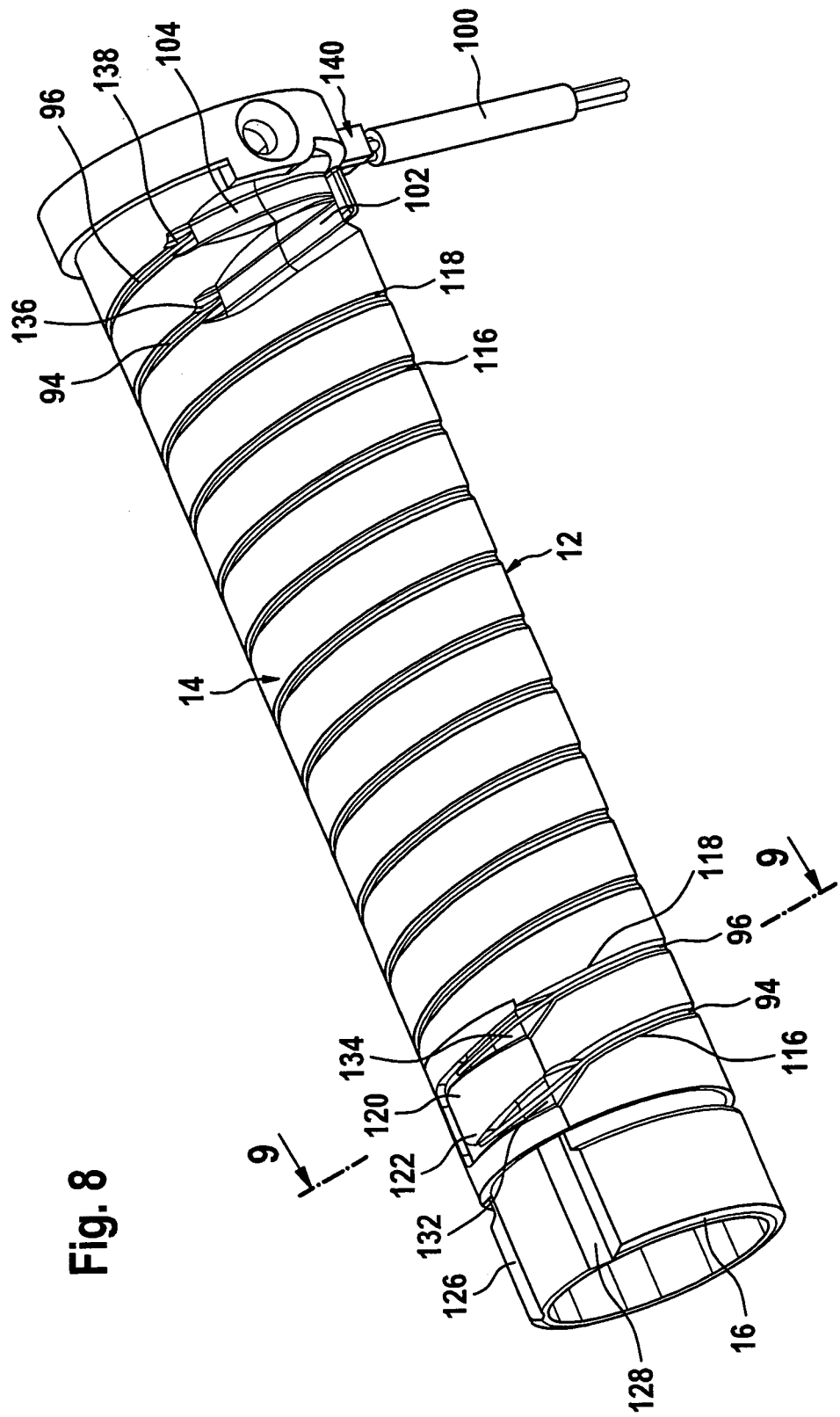
FIG. 8 shows a perspective illustration of a grip base of a sixth exemplary embodiment of a hand grip according to the invention.

As an alternative to the protrusions 106 which are illustrated for the fifth exemplary embodiment according to FIG. 7, it is also possible, as is illustrated in conjunction with the sixth exemplary embodiment in FIG. 8, to provide the grip tube 14 with helically running spaced-apart grooves 116, 118, into which the heating wires 94, 96 can then be introduced.

In the case of a further solution, albeit one which is not illustrated in the drawing, both grooves 116, 118 and protrusions 106 may be provided on the grip tube 14.

Figure 9:
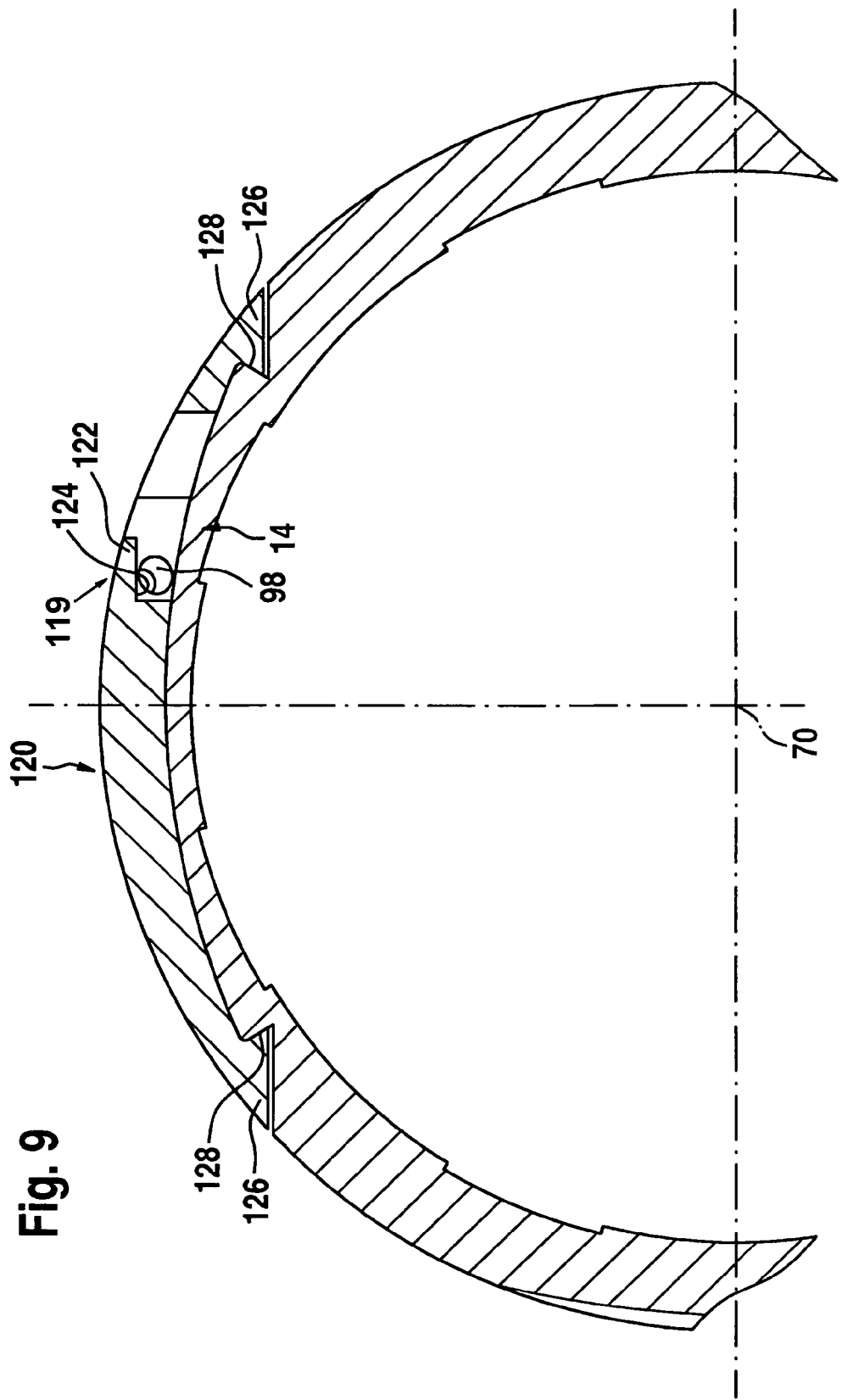
FIG. 9 shows a section along line 9-9 in FIG. 8.

In order for the turn-back component 98 of the heating coil 92 to be reliably secured on the grip tube 14, the grip tube 14, as is illustrated in FIG. 9, is provided with a holder 119 which either may be integrally formed on the grip tube 14 or may be provided on an insert part 120 which can be fixed on the grip tube 14 and, as is illustrated in FIG. 9, comprises, as holder 119, a nose 122 with an undercut region 124 into which the turn-back component 98 of the heating coil 92 can be introduced, so that the turn-back component 98 can be introduced into the undercut region 124 between the nose 122 and the grip tube 14 and can thus be secured between the nose 122 and grip tube 14.

As is illustrated in FIG. 9, by virtue of being pushed on parallel to the longitudinal center axis 70, the insert part 120 is preferably guided by way of foot parts 126 in dovetail-like guide grooves 128 and, guided in these guide grooves 128, can be pushed onto the grip tube 14, starting from the outer end 16 of the grip tube 14, to the extent where grooves 132 and 134, which are likewise provided in the insert part 120 following the undercut region 124, are aligned with the grooves 116, 118, which run helically in the grip tube 14, so that the heating wires 94, 96 can enter into the grooves 132, 134 from the helical grooves 116, 118 and run as far as the turn-back component 98.

The insert part 120 thus easily makes it possible for the heating coil 92 to be fixed securely as it wound onto the grip base 12.

Further secure fixing of the heating coil 92 takes place in the region of inner connections 136, 138, which connect the heating wires 94, 96 in an electrically conductive manner to the conductors 102, 104 of the supply line 100.

For this purpose, as is illustrated in FIG. 8, the grip base 12 has provided on it a fixing element 140 which allows the supply line 100 with the conductors 102 and 104 to be secured relative to the grip base 12.

Figure 10:
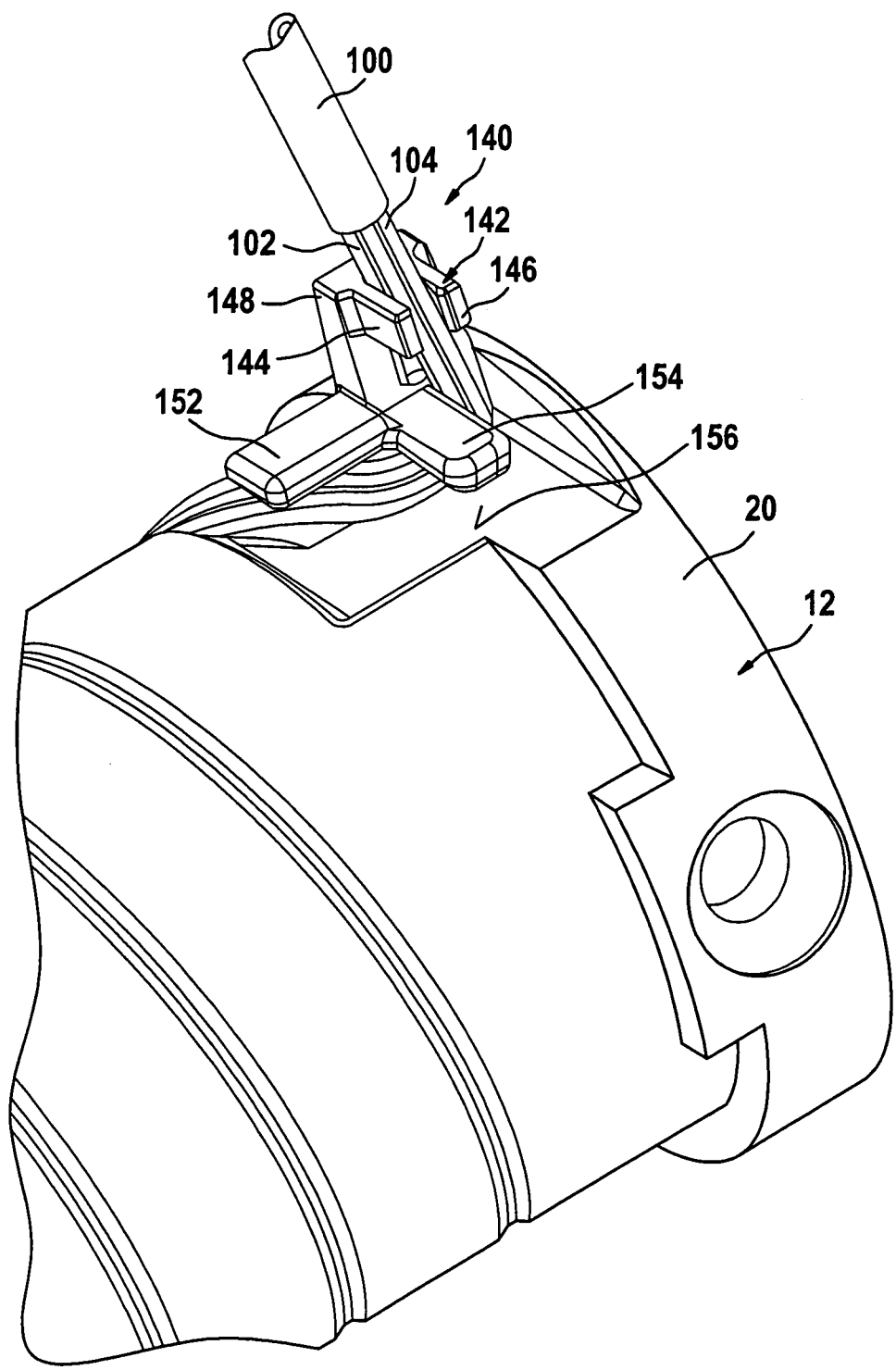
FIG. 10 shows an enlarged perspective illustration of a fixing device of the sixth exemplary embodiment.

As is illustrated in FIG. 10, such a fixing element 140 comprises a clamping device 142, in which the conductors 102, 104 of the supply line 100, or the supply line as a whole, can be clamped in between two clamping fingers 144, 146, and can thus be fixed prior to the grip covering 22 being injection molded onto the grip base 12.

The clamping device 142 here is preferably seated on a base 148 which extends away from the grip tube 14 in the radial direction and is integrally formed on the grip base 12, for example in the region of the grip-tube collar 20.

Provided on a foot of the base 148, for example, are holding-down fingers 152, 154, which are spaced apart from an abutment surface 156 of the grip base 12 and fix the conductors 102, 104 between them and the abutment surface 156, in particular in engagement against the abutment surface 156, the holding-down finger 154 simultaneously forming a turn-back means for the conductors 102, 104 which, in the first instance running radially in relation to the longitudinal center axis 70, extend from the clamping device 142 to the abutment surface 156 and then run parallel to the abutment surface 156 and are deflected by the holding-down finger 154, while the holding-down finger 152 additionally keeps the conductors 102, 104 in engagement against the bearing surface 156 of the grip tube 14.

It is also possible, however, for the holding-down fingers 152, 154 to be combined to form one holding-down finger.

When a grip base 12 having the fixing element 140 is encapsulated using injection molding, the fixing element is embedded in the grip covering 22, in particular in the inner guide ring 34, so that the fixing element 140, as a whole, is no longer visible.

Moreover, a kink guard 160 is integrally formed in extension of the inner guide ring 34, this kink guard also enclosing the supply line 100 over a certain distance, starting from the inner guide ring 34, in order for the supply line 100 to be provided with additional protection at its exit from the inner guide ring 34.

In particular, the kink guard 160 here is formed from the same soft/resilient material as the grip covering 22 and is integrally formed with the latter in a single injection-molding operation.

An outer covering 101 of the supply line 100 is also advantageously produced from the same base material, or even better the same material, as the kink guard 160, so that these can be securely connected to one another to good effect, and in particular also in a gas-tight and/or liquid-tight manner.

A particularly advantageous solution provides that the coverings 103, 105 of the individual conductors 102, 104 are also made of the same base material, or even better the same material, as the kink guard 160.

Figure 11:
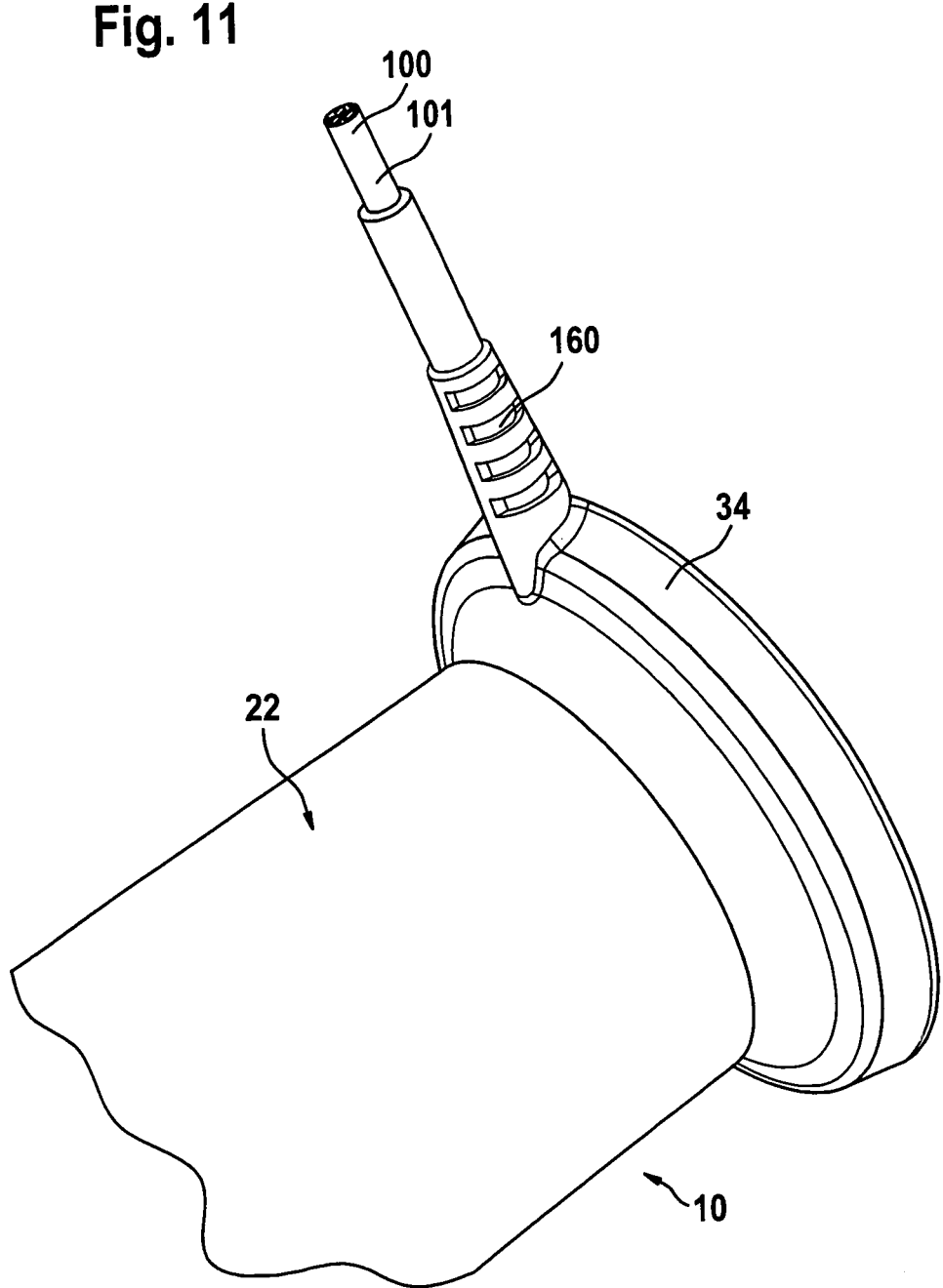
FIG. 11 shows a perspective illustration of the grip covering injection molded onto the grip base with the fixing device according to the sixth exemplary embodiment.

In the case of the sixth exemplary embodiment according to FIGS. 10 and 11, the supply line 100 forms an exit point which runs radially in relation to the longitudinal center axis 70, since the fixing element 140 guides the supply line 100 radially in relation to the center axis 70.

Figure 12:
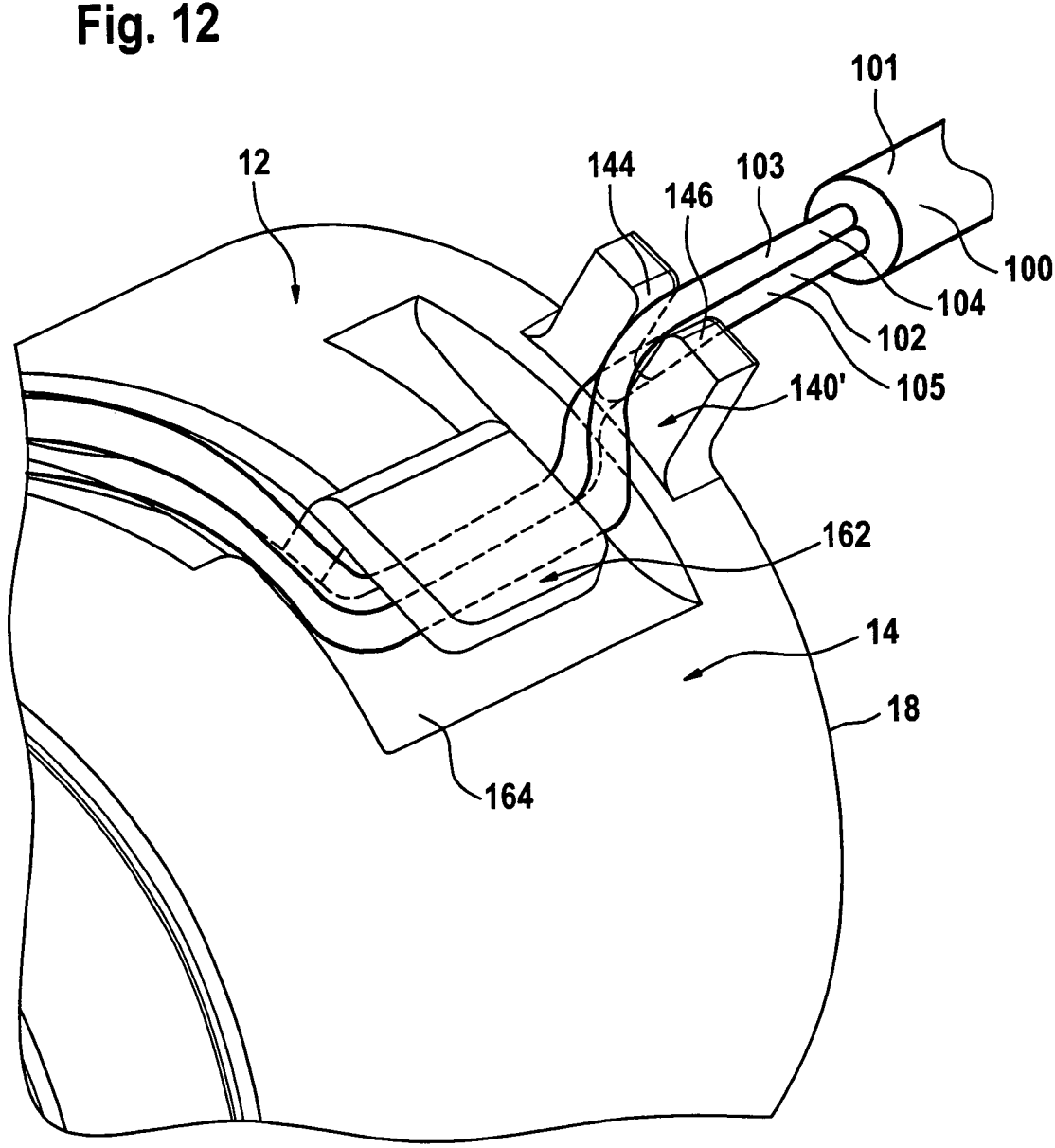
FIG. 12 shows a perspective illustration, similar to FIG. 10, of a grip base with fixing device of a seventh exemplary embodiment.
Figure 13:
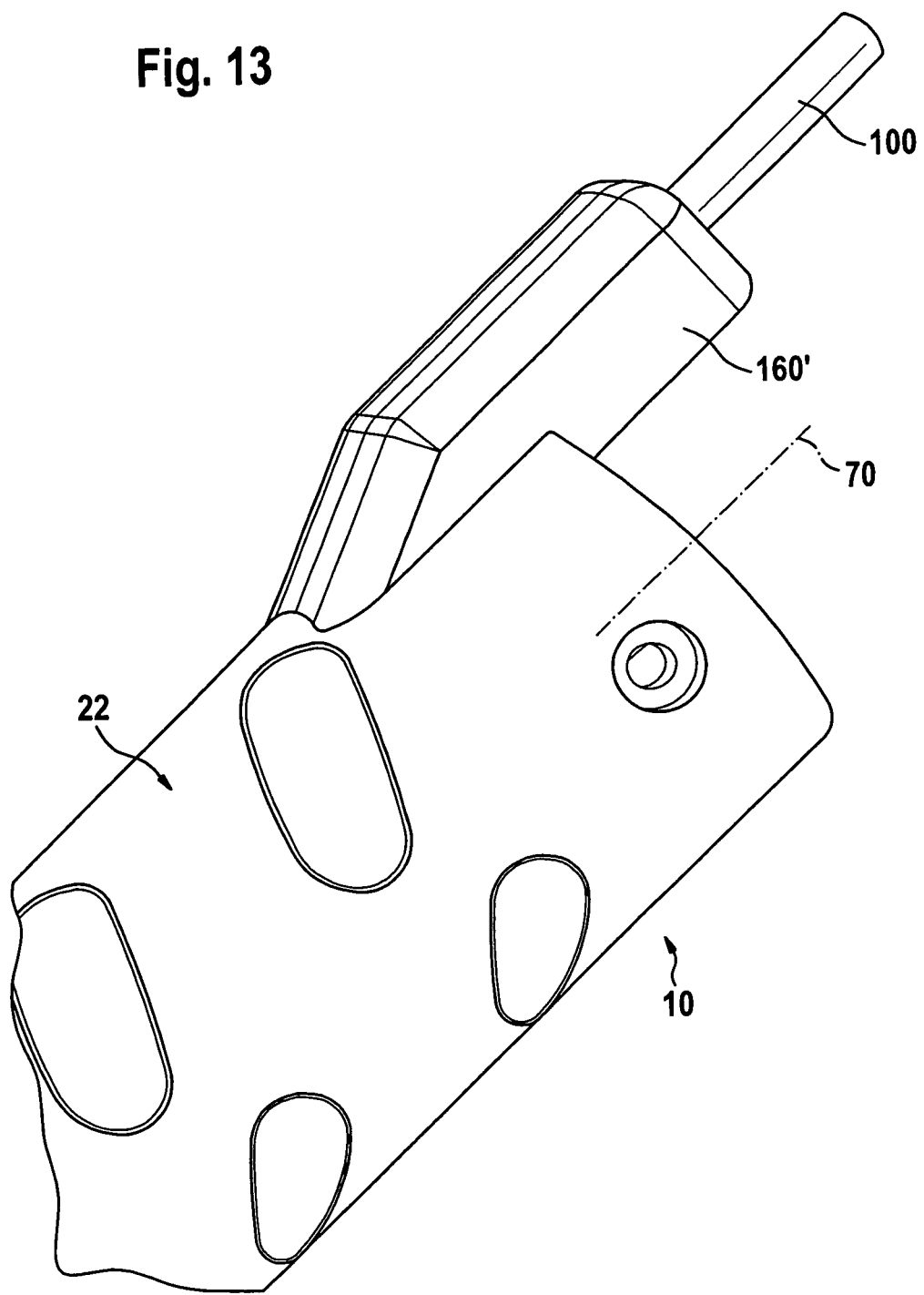
FIG. 13 shows a perspective illustration of the grip covering integrally formed on the grip base with fixing device by injection molding.

As an alternative to this, a seventh exemplary embodiment, which is illustrated in FIGS. 12 and 13, has an axial exit point, in the case of which the fixing element 140' keeps the conductors 102, 104 of the supply line 100 aligned approximately parallel to the longitudinal center axis 70, the fixing element 140' likewise comprising two clamping fingers 144, 146, although these are integrally formed on the grip tube 14, in the region of the inner end 18 of the same, without a base 148.

Also provided, separately from the clamping fingers 144, 146, is a holding-down means 162, which holds the conductors 102, 104 in engagement against the grip tube 14 between itself and a bearing surface 164 associated with the holding-down means 162, so that, starting from the holding-down means 162, the conductors 102, 104 can then extend to the inner connections 136, 138 which have already been described.

It is likewise the case with this exemplary embodiment that the operation of encapsulating the grip base 12 using injection molding results in a kink guard 160', the latter, in this exemplary embodiment, however, extending approximately parallel to the longitudinal center axis 70 of the hand grip 10 and likewise embedding the fixing element 140 to the full extent.

Figure 14:
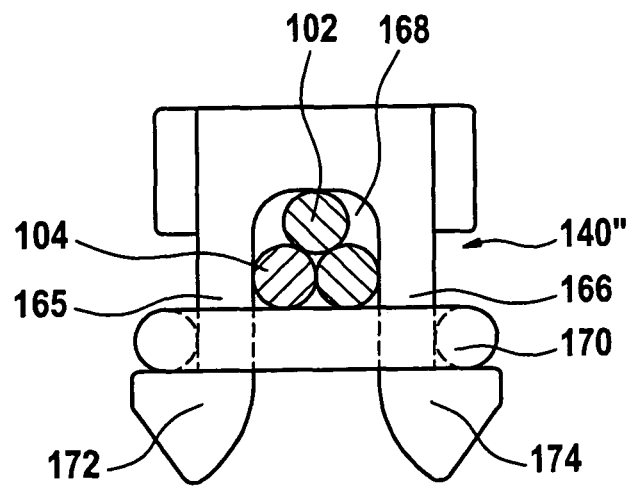
FIG. 14 shows a fixing device according to an eighth exemplary embodiment of a hand grip according to the invention.

As an alternative to the fixing elements 140 and 140' having two clamping fingers 144 and 146 between which the conductors 102 and 104 can be clamped in, provision is made in the case of a fixing element 140" according to an eighth exemplary embodiment of the hand grip according to the invention, this embodiment being illustrated in FIG. 14, that two hook fingers 165, 166 are provided instead of the two clamping fingers 144 and 146, and these hook fingers have disposed between them an interspace 168 into which the conductors 102, 104 of the supply line 100 can be introduced, it being possible to push onto the hook fingers 165 and 166 an elastic closure element 170 which engages behind hooks 172, 174 of the hook fingers 165, 166, this closure element thereby acting on the conductors 102, 104 in the interspace 168, which are thus secured in a force-fitting manner between the hook fingers 165 and 166 and the closure element 170.

Figure 15:
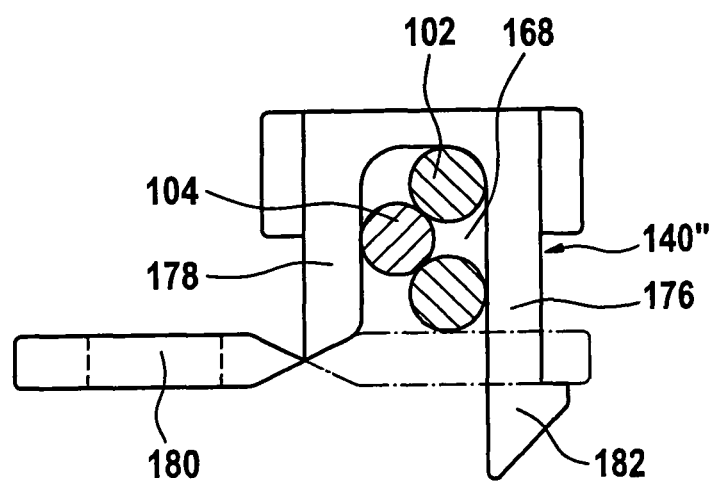
FIG. 15 shows a fixing device according to a ninth exemplary embodiment of a hand grip according to the invention.

A fixing element 140" according to a ninth exemplary embodiment, which is illustrated in FIG. 15, has just one hook finger 176 and a further finger 178, on which is articulated a closure flap 180 which closes the interspace 168 at the ends of the fingers 176, 178 and, by engaging behind a hook 182 of the hook finger 176, can be secured on the latter, so that the conductors 102, 104 can likewise be secured in the interspace by the closure flap 180.

Figure 16:
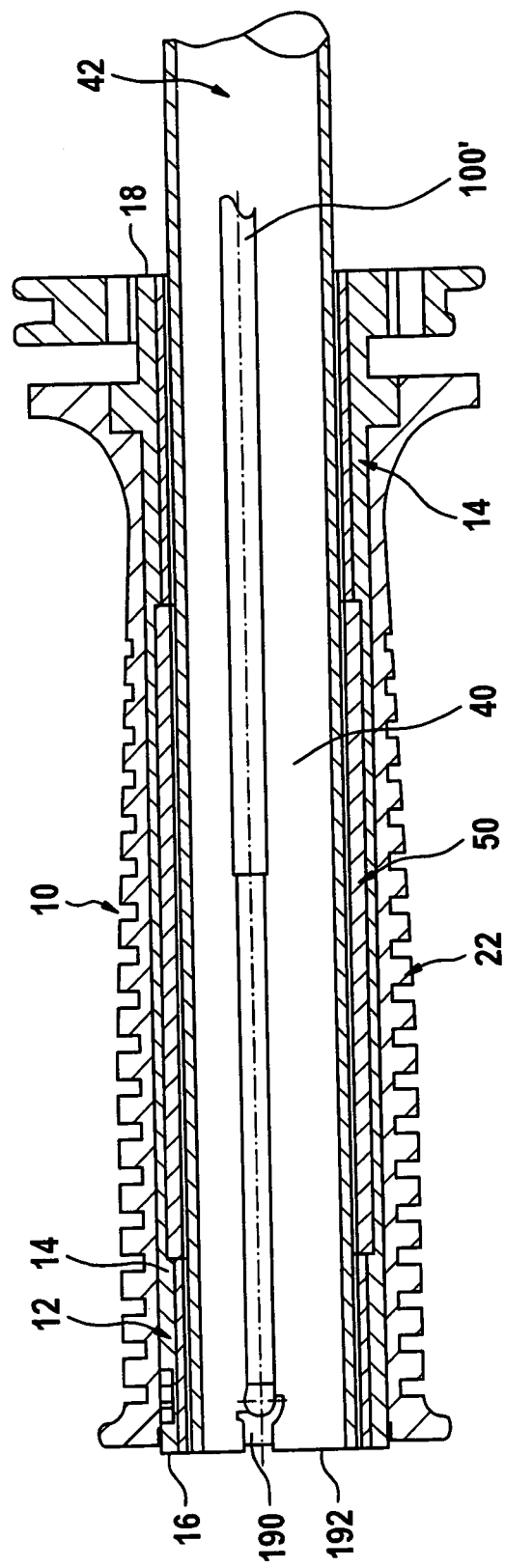
FIG. 16 shows a sectional illustration, similar to FIG. 1, of a tenth exemplary embodiment of a hand grip according to the invention.

As an alternative to the exemplary embodiments which have been described thus far, instead of the outwardly guided supply line 100, a tenth exemplary embodiment of a hand grip according to the invention, which is illustrated in FIG. 16, has a so-called inner exit point, in the case of which the supply line 100' is guided through the interior of the grip component 40 and of the handlebar 42, for which purpose the grip component 40 has a cutout 190 which is located in the region of an outer end 192 of the grip component and through which the supply line 100 can be guided from the interior of the grip component 40, through the cutout 190, to the hand grip 10, and in particular to the outer end 16 of the grip tube 14 of the grip base 12, at which the supply line 100 can be secured in any desired manner.

It is thus the case with this tenth exemplary embodiment that the turn-back component 98 of the heating coil 92 is located in the vicinity of the inner end 18 of the grip tube 14.

For the case where the hand grip according to the tenth exemplary embodiment is in the form of a throttle grip, the latter is mounted in a rotatable manner on a sleeve which, for its part, is fixed on the handlebar 42. This sleeve may replace, for example, the supporting structure 50, so that the grip tube 14 can be rotated in relation to this sleeve 50.

Figure 17:
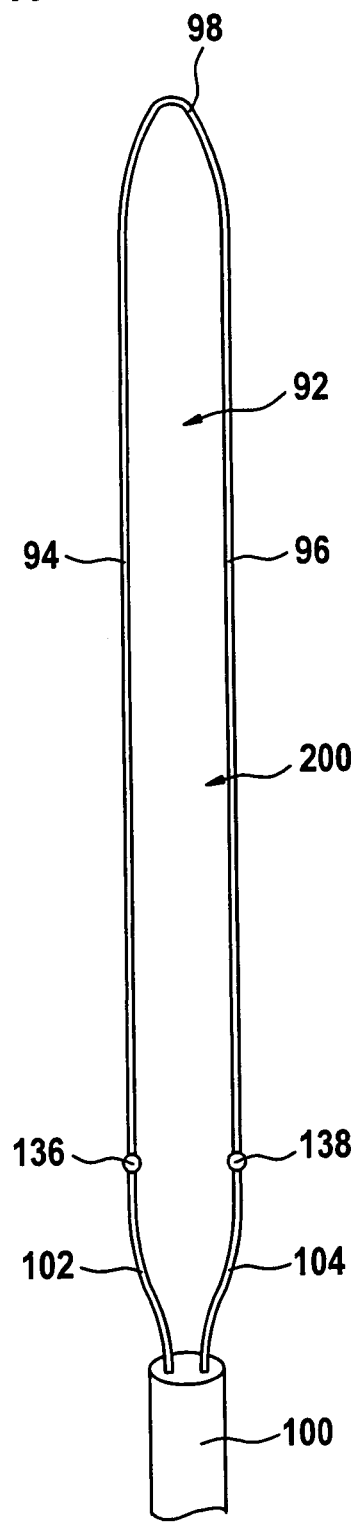
FIG. 17 shows an illustration of a heating loop according to the first exemplary embodiment.

In conjunction with the description of the individual exemplary embodiments which has been given thus far, all that has been explained is that the heating coil 92, as illustrated in a simplified manner in FIG. 17, is to have two heating wires, namely the heating wires 94 and 96, which are to be wound onto the grip base 12, and fixed thereon, at a spacing apart from one another, in which case the two heating wires 94, 96 should run as far as the U-shaped turn-back component 98.

Such a hand grip 10 thus merely has a single heating loop 200, in which current flows in order to heat the same.

In order to achieve different heating capacities, it is thus necessary to control the current in the heating loop 200.

Figure 18:
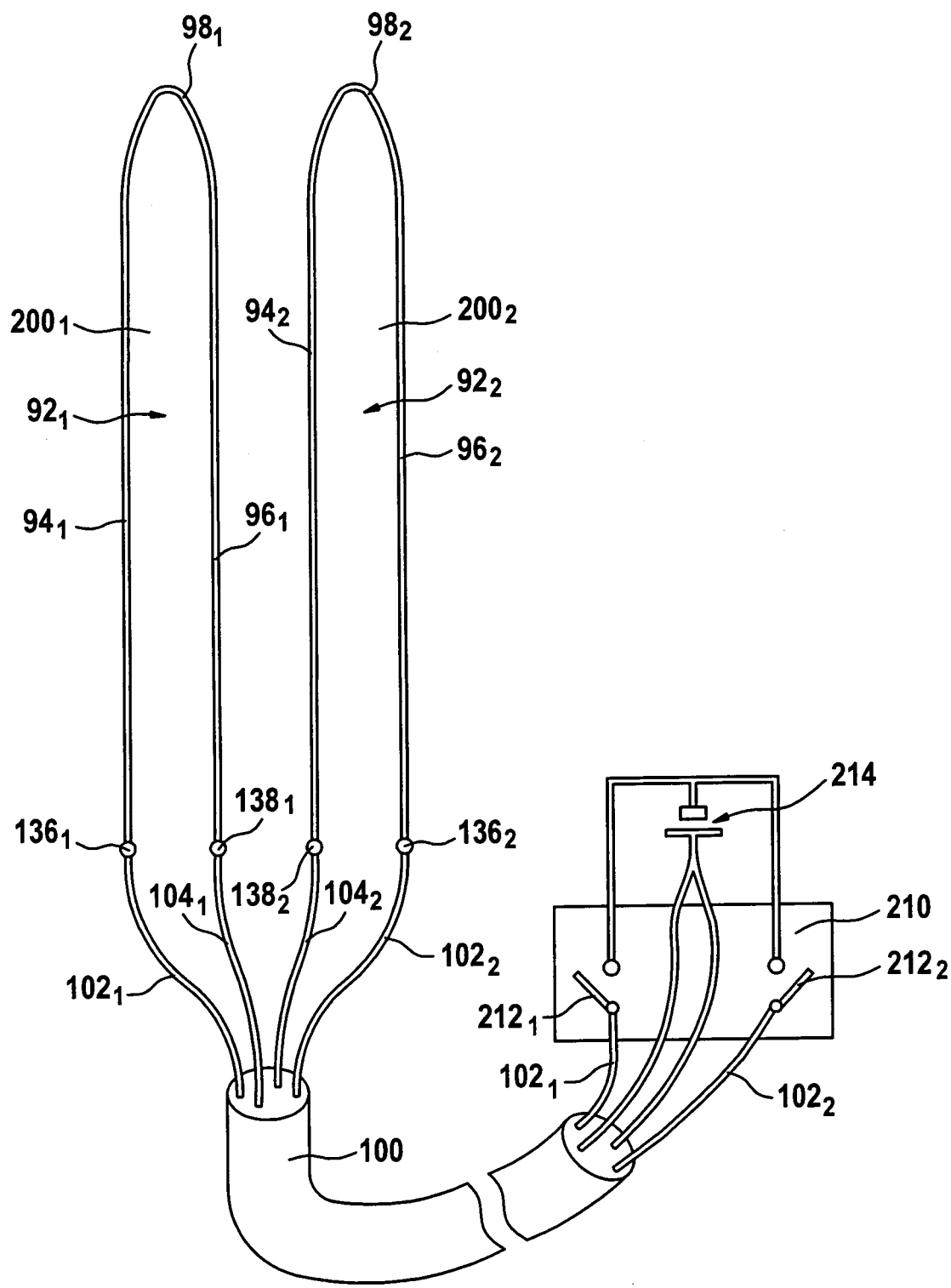
FIG. 18 shows an illustration of a plurality of heating loops for an eleventh exemplary embodiment of a hand grip according to the invention.

A simplified possible way of heating the hand grip 10 according to an eleventh exemplary embodiment provides on the same grip base 12, as is illustrated in FIG. 18, two heating loops $200_1$ and $200_2$, each of which extends from the respective inner connections $136_1$, $138_1$, $136_2$, $138_2$ and can be fed in parallel, via respective conductors $102_1$, $104_1$ and $102_2$, $104_2$ of the supply line 100, from a power source 214.

It is thus possible to use a single switching device 210, for example switches $212_1$ and $212_2$ which are associated with the conductors $102_1$ and $102_2$, to connect the individual heating loops $200_1$ and $200_2$ individually to the power source 214 and thus to activate both heating loops $200_1$ and $200_2$, or just one heating loop, in the hand grip 10.

If one of the heating loops $200_1$ and $200_2$ here has a heating capacity which differs from the heating capacity of the other heating loop, for example has half the capacity thereof, then closing both switches $212_1$ and $212_2$ makes it possible to achieve, as maximum heating capacity, the sum of the heating capacities of the heating loops $200_1$, $200_2$, closing that switch $212_1$, $212_2$ which activates the heating loop $200_1$ or $200_2$ with the greater heating capacity makes it possible to realize the greater heating capacity, for example a heating capacity of two thirds of the maximum heating capacity, and closing that switch $212_2$ or $212_1$ which activates the heating loop $200_2$ or $200_1$ with the lower heating capacity makes it possible to achieve the lower heating capacity, for example a heating capacity of a third of the maximum heating capacity, so that, overall, the provision of just two switches $212_1$ and $212_2$ makes it possible altogether for the hand grip 10 to be heated in a total of three heating-capacity stages.

Figure 19:
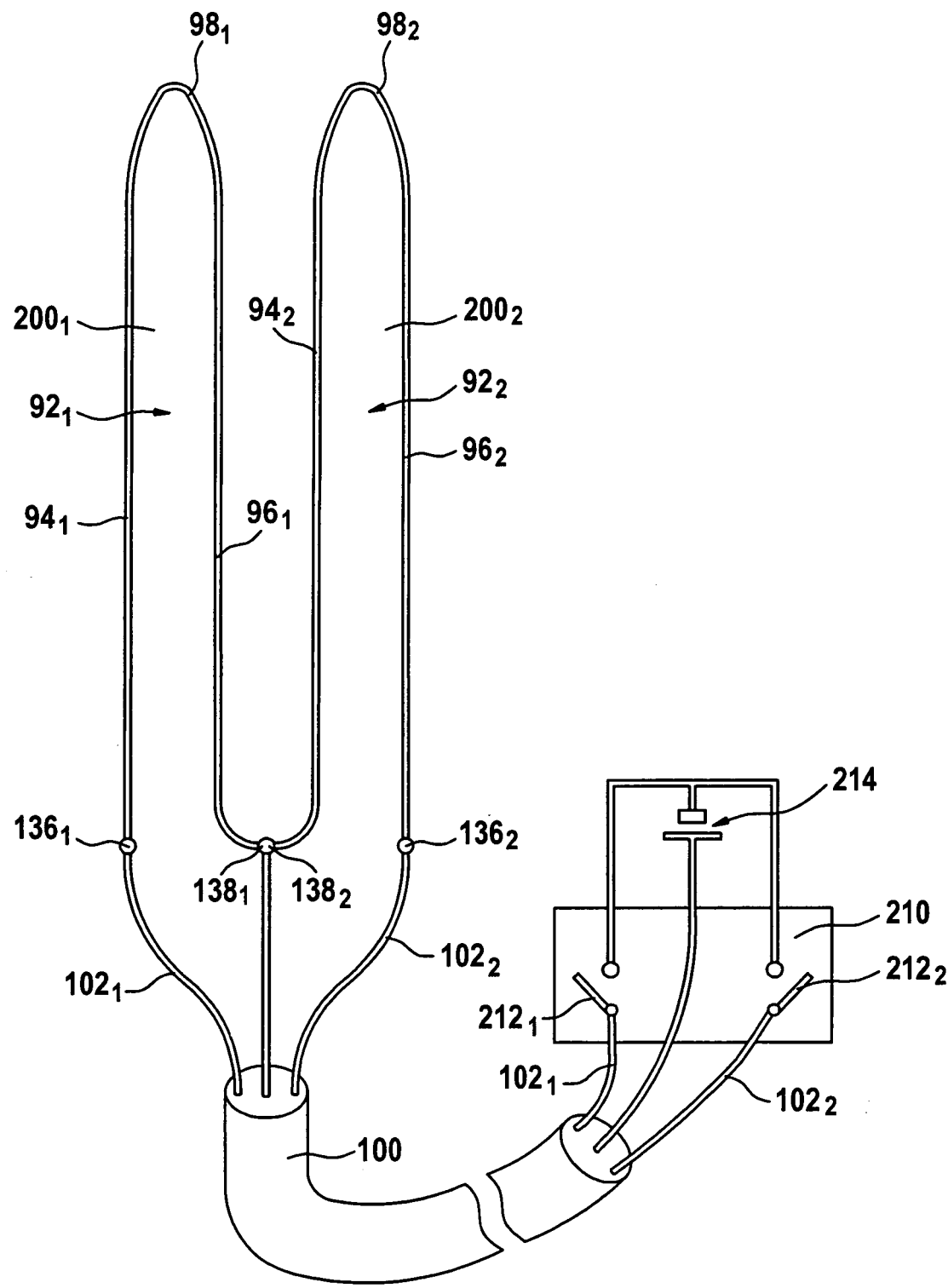
FIG. 19 shows an illustration of a plurality of heating loops for a twelfth exemplary embodiment, similar to FIG. 18, with simplified energization.

The eleventh exemplary embodiment according to FIG. 18 can also be additionally simplified in that, as is illustrated for the twelfth exemplary embodiment in FIG. 19, the two conductors $104_1$ and $104_2$ can be replaced by a single conductor 104 which—if necessary—may have a correspondingly adapted line cross-section.

Figure 20:
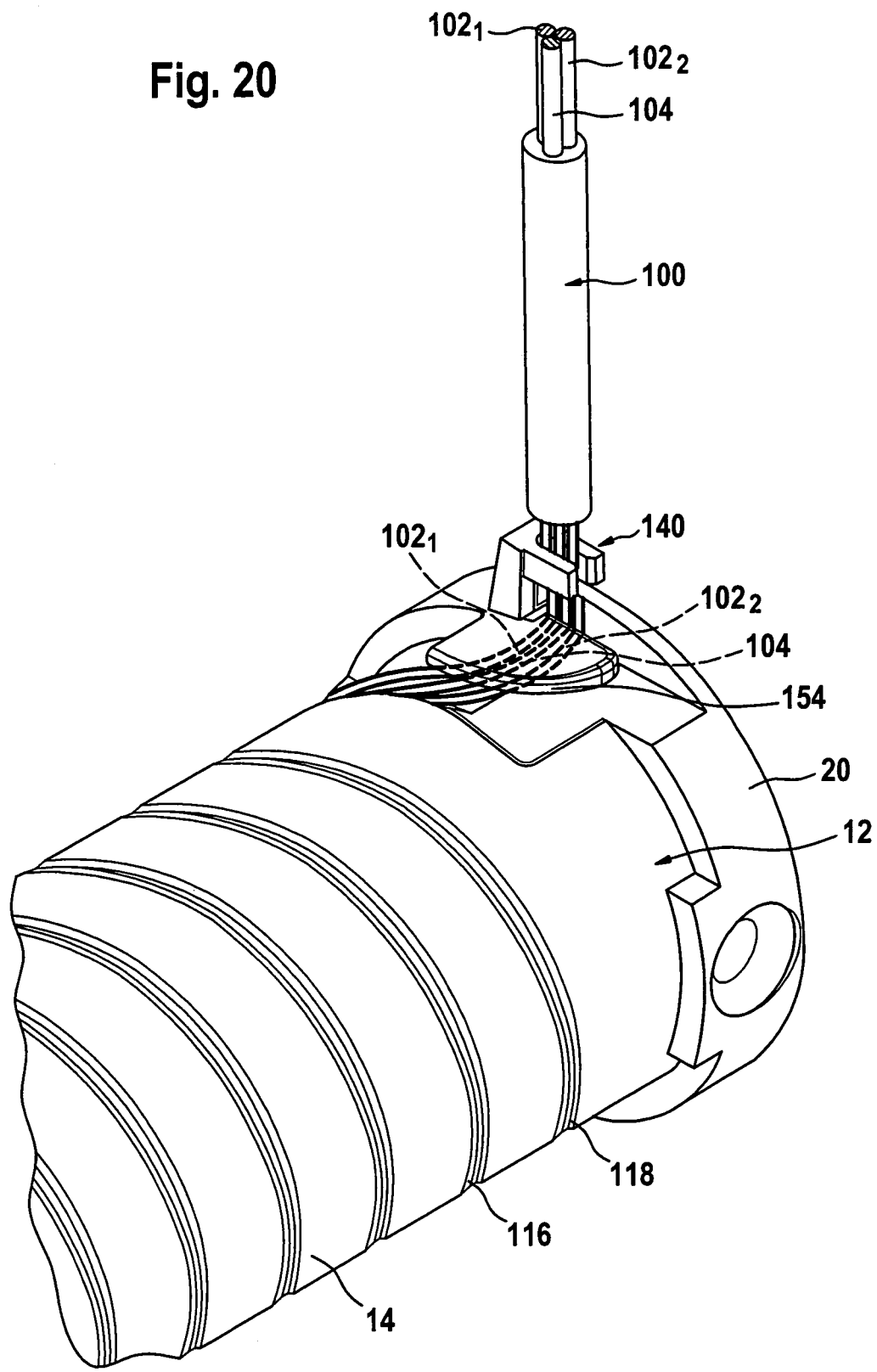
FIG. 20 shows an illustration of the grip base similar to FIG. 7, for the twelfth exemplary embodiment.

In the case of the twelfth exemplary embodiment according to FIG. 19, for example—as is illustrated in FIG. 20—the two heating loops $200_1$ and $200_2$ are located in the grooves 116, 118 such that the first heating wires $94_1$ and $94_2$ and the second heating wires $96_1$ and $96_2$ are located one beside the other and the turn-back components $98_1$ and $98_2$ are fixed in the same holder 119 on the grip base 12.

In this case, the first heating wires $94_1$, $96_1$ and the second heating wires $94_2$ and $96_2$, and also the turn-back components $98_1$ and $98_2$, are insulated electrically in relation to one another, preferably by use being made of enamel-insulated wires.

The same method of disposing the heating coils $92_1$ and $92_2$ is also possible in the case of protrusions 106, provided on the grip base 12, for separating the heating wires 94, 96.

It is also possible for the heating wires 94, 96 of the heating loops $200_1$ and $200_2$ according to the eleventh exemplary embodiment to be disposed in the same way.

Figure 21:
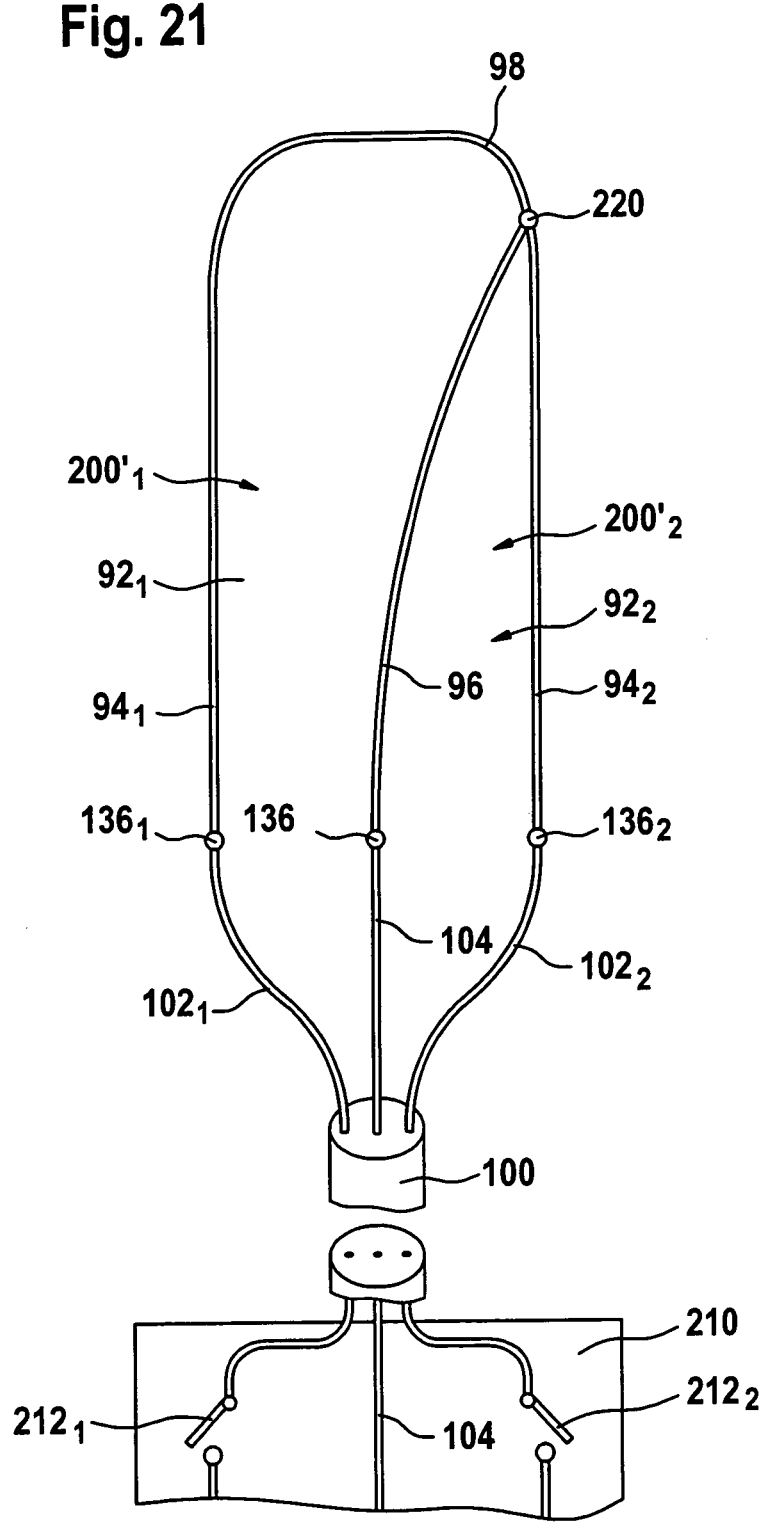
FIG. 21 shows an illustration of the realization of a plurality of heating loops for a thirteenth exemplary embodiment of a hand grip according to the invention.

As is illustrated for a thirteenth exemplary embodiment in FIG. 21, a further possible way of realizing a plurality of heating loops $200'_1$ and $200'_2$ makes provision for two heating wires $94_1$ and $94_2$ to be guided from the inner connections $136_1$ and $136_2$ to an intermediate tapping point 220, from which a single heating wire 96 leads to the inner connection 136. The conductors $102_1$ and $102_2$ of the supply line 100, these conductors being guided to the inner connections $136_1$ and $136_2$, are connected, in turn, to the switches $212_1$ and $212_2$ of the switching device 210, so that it is likewise the case, in the manner described, that closing both switches $212_1$ and $212_2$ makes it possible to energize both heating loops $200'_1$ and $200'_2$, while closing one of the switches $212_1$ and $212_2$ makes it possible to energize one of the two heating loops $200'_1$ and $200'_2$.

Depending on the location of the intermediate tapping point 220, it is thus possible to define the heating capacity of the heating loops $200'_1$ and $200'_2$ during production of the hand grip 10, and thus also to define what heating capacity is to be available for heating the hand grip 10 when both switches 212₁ and 212₂ are closed or one of the switches 212₁ and 212₂ is closed.

The invention claimed is:

1. A hand grip for handlebar-steered vehicles, comprising:
   a grip covering,
   a grip base covered by the grip covering and provided with heating wires forming at least one heating loop for heating the hand grip electrically, the heating wires forming at least one heating coil with ends of the heating wires electrically connected together by a turn-back component,
   an insert part mounted on the grip base separate from the grip covering, said insert part comprising a foot part adapted to be pushed into corresponding guide grooves in the grip base for maintaining said insert part on said grip base, said insert part having a holder for fixing the turn-back component to the grip base, the holder comprising an undercut region of the insert part, and
   the grip base surrounding an accommodating space which extends, by way of its longitudinal extent, from a plug-in opening in a plug-in direction for a grip component of the handlebar.

2. The hand grip according to claim 1, wherein the heating wires and the turn-back component are formed by a single-piece wire.

3. The hand grip according to claim 1, wherein:
   the foot part is integrally formed on the insert part; and
   the guide grooves are integrally formed on the grip base.

4. A hand grip for handlebar-steered vehicles, comprising:
   a grip covering,
   a grip base covered by the grip covering and provided with heating wires forming at least one heating loop for heating the hand grip electrically,
   a fixing element, the fixing element being one of directly connected to or integrally formed on the grip base,
   a supply line for the heating loop, the supply line being fixed in the fixing element, the fixing element being provided with at least one holding down finger for fixing conductors of the supply line between the at least one holding down finger and the grip base,
   the at least one holding finger being spaced apart from an abutment surface of the grip base and extending parallel to the abutment surface, the at least one holding finger being supported at one end on the grip base and having another end extending freely above the abutment surface, and
   the grip base surrounding an accommodating space which extends, by way of its longitudinal extent, from a plug-in opening in a plug-in direction for a grip component of the handlebar.

5. A hand grip for handlebar-steered vehicles, comprising:
   a grip covering,
   a grip base covered by the grip covering and provided with heating wires forming at least one heating loop for heating the hand grip electrically,
   a fixing element, the fixing element being one of directly connected to or integrally formed on the grip base, the fixing element extending away from the grip base and comprising a clamping device with two parallel clamping fingers,
   a supply line for the heating loop, the supply line being clamped between the clamping fingers of the fixing element in a force-fitting manner, and
   the grip base surrounding an accommodating space which extends, by way of its longitudinal extent, from a plug-in opening in a plug-in direction for a grip component of the handlebar.

6. The hand grip according to claim 4, wherein the fixing element is embedded in the grip covering.

7. The hand grip according to claim 4, wherein a kink guard for the supply line is integrally formed on the grip covering.

8. The hand grip according to claim 1, wherein a plurality of heating loops are provided in the hand grip.

9. The hand grip according to claim 8, wherein the heating loops have different heating capacities.

10. The hand grip according to claim 8, wherein the plurality of heating loops are disposed in parallel.

11. The hand grip according to claim 8, wherein the plurality of heating loops are assigned a switching device which can activate one or more heating loops.

12. The hand grip according to claim 8, wherein the plurality of heating loops are formed from electrically insulated electric lines.

13. The hand grip according to claim 12, wherein the electric lines are enamel-insulated.

14. The hand grip according to claim 8, wherein respective turn-back components of the plurality of heating loops can be fixed in the holder.

15. The hand grip according to claim 8, wherein the plurality of heating loops are disposed on the grip base with the heating wires running one beside the other.

16. The hand grip according to claim 8, wherein respective first and second heating wires of the heating loops run in the same grooves.

17. The hand grip according to claim 8, wherein respective first and second heating wires of the plurality of heating loops run between the same protrusions.

* * * * *

UNITED STATES PATENT AND TRADEMARK OFFICE
CERTIFICATE OF CORRECTION

PATENT NO. : 8,680,436 B2
APPLICATION NO. : 12/012800
DATED : March 25, 2014
INVENTOR(S) : Schmauder et al.

Page 1 of 1

It is certified that error appears in the above-identified patent and that said Letters Patent is hereby corrected as shown below:

On the title page, please add:

Related U.S. Application Data
(63) Continuation of application No. PCT/EP2006/007728, filed on August 4, 2006

Signed and Sealed this
Seventh Day of October, 2014

Michelle K. Lee
*Deputy Director of the United States Patent and Trademark Office*